(12) United States Patent
Drewes et al.

(10) Patent No.: US 8,281,931 B2
(45) Date of Patent: Oct. 9, 2012

(54) APPARATUS AND METHOD FOR POST-THRESHING INSPECTION AND SORTING OF TOBACCO LAMINA

(75) Inventors: Harry Drewes, Hamburg (DE); Wolfgang Benz, Börnsen (DE); Hans Dierken, Amelinghausen (DE); Peter Funke, Hamburg (DE); Frank Schuster, Hamburg (DE); Cliff J. Leidecker, Rogue River, OR (US); J. Thomas Higgins, Medford, OR (US)

(73) Assignee: Key Technology, Inc., Walla Walla, WA (US)

( * ) Notice: Subject to any disclaimer, the term of this patent is extended or adjusted under 35 U.S.C. 154(b) by 469 days.

(21) Appl. No.: 12/586,184

(22) Filed: Sep. 18, 2009

(65) Prior Publication Data

US 2011/0067714 A1     Mar. 24, 2011

(51) Int. Cl.
   *B07B 7/00* (2006.01)
(52) U.S. Cl. ............ 209/154; 209/139.1; 209/149; 131/109.2; 131/110
(58) Field of Classification Search ............ 209/134, 209/138, 139.1, 147, 149, 154, 576, 587; 131/109.2, 110, 312
   See application file for complete search history.

(56) References Cited

U.S. PATENT DOCUMENTS

| | | | |
|---|---|---|---|
| 2,131,095 A | 9/1938 | Cox | |
| 2,173,087 A | 9/1939 | Eissmann | |
| 2,267,326 A | 12/1941 | Eissmann | |
| 2,645,343 A | 7/1953 | Nemir | |
| 3,549,008 A | 12/1970 | Anderson | |
| 3,593,851 A | 7/1971 | Davidson | |
| 3,608,716 A | 9/1971 | Rowell | |
| 3,655,043 A * | 4/1972 | Wochnowski et al. | 209/138 |
| 3,685,650 A | 8/1972 | Walther et al. | |
| 3,750,882 A | 8/1973 | Hays | |
| 3,770,112 A | 11/1973 | Asfour | |
| 3,782,544 A | 1/1974 | Perkins, III | |
| 3,854,586 A | 12/1974 | Perkins, III | |
| 3,917,070 A | 11/1975 | Asfour | |
| 3,928,183 A | 12/1975 | Asfour | |
| 3,939,983 A | 2/1976 | Asfour | |
| 3,968,366 A | 7/1976 | Asfour | |

(Continued)

FOREIGN PATENT DOCUMENTS

DE    3428966    2/1986

(Continued)

OTHER PUBLICATIONS

Written Opinion for PCT/US 10/02543, Form 237, dated Nov. 23, 2010.

*Primary Examiner* — Joseph C Rodriguez
(74) *Attorney, Agent, or Firm* — Paine Hamblen, LLP

(57) ABSTRACT

An apparatus and method for post-threshing inspection and sorting of tobacco lamina is described and which includes a separation conduit which receives a source of post-threshed tobacco lamina and other contaminants for inspection and sorting, and wherein a source of pressurized air causes the tobacco lamina to move along the separation conduit past an inspection station where it is optically inspected to identify undesirable tobacco lamina or other contaminants; and a downstream reject station is provided which responds to a sorting signal provided by the inspection station and which removes unwanted or undesirable tobacco lamina and other contaminants from an air stream so as to provide a resulting product which is substantially free from contaminants or other defects.

15 Claims, 12 Drawing Sheets

U.S. PATENT DOCUMENTS

| | | | |
|---|---|---|---|
| RE29,042 E * | 11/1976 | David | 131/84.3 |
| 4,018,674 A | 4/1977 | Morris | |
| 4,465,194 A | 8/1984 | Coleman | |
| 4,475,562 A | 10/1984 | Thatcher et al. | |
| 4,609,108 A | 9/1986 | Hristozov et al. | |
| 4,657,144 A | 4/1987 | Martin et al. | |
| 4,701,256 A | 10/1987 | Cross, Jr. | |
| 4,729,388 A | 3/1988 | Mattei | |
| 4,867,179 A | 9/1989 | Leonard | |
| 4,875,495 A | 10/1989 | Wheless | |
| 4,883,077 A | 11/1989 | Irigoyen | |
| 4,895,174 A | 1/1990 | Henderson et al. | |
| 4,938,235 A | 7/1990 | Hirsch et al. | |
| 4,941,482 A | 7/1990 | Heitmann et al. | |
| 4,971,077 A | 11/1990 | Dominguez et al. | |
| 4,991,598 A | 2/1991 | Henderson et al. | |
| 5,063,944 A | 11/1991 | Parker | |
| 5,090,576 A | 2/1992 | Menten | |
| 5,188,127 A | 2/1993 | Heitmann | |
| 5,199,448 A | 4/1993 | Parker | |
| 5,205,415 A | 4/1993 | Surtees | |
| 5,267,576 A | 12/1993 | Heitmann | |
| 5,267,578 A | 12/1993 | Brackmann et al. | |
| 5,294,218 A | 3/1994 | Fiorentini et al. | |
| 5,305,893 A | 4/1994 | Hereford | |
| 5,325,875 A | 7/1994 | Coleman et al. | |
| 5,331,978 A | 7/1994 | Parker | |
| 5,358,122 A | 10/1994 | Surtees | |
| 5,388,704 A | 2/1995 | Morris | |
| 5,394,893 A | 3/1995 | Coleman et al. | |
| 5,427,248 A | 6/1995 | Levy et al. | |
| 5,460,189 A | 10/1995 | Coleman et al. | |
| 5,462,176 A | 10/1995 | Hereford et al. | |
| 5,476,108 A | 12/1995 | Dominguez et al. | |
| 5,476,109 A | 12/1995 | Coleman et al. | |
| 5,538,017 A | 7/1996 | Webb et al. | |
| 5,579,920 A * | 12/1996 | Garabedian et al. | 209/139.1 |
| 5,967,146 A | 10/1999 | Orihara et al. | |
| 6,003,681 A | 12/1999 | Wilbur et al. | |
| 6,019,105 A | 2/2000 | White | |
| 6,283,300 B1 * | 9/2001 | Bielagus et al. | 209/29 |
| 6,332,543 B1 | 12/2001 | Niehues et al. | |
| 6,435,191 B1 | 8/2002 | Roudabush et al. | |
| 6,542,234 B1 | 4/2003 | Ulrich et al. | |
| 6,768,317 B2 | 7/2004 | Möller et al. | |
| 6,877,515 B2 | 4/2005 | Heitmann et al. | |
| 7,128,216 B2 * | 10/2006 | Kokko | 209/639 |
| 7,335,847 B2 | 2/2008 | Drewes et al. | |
| 7,383,840 B2 | 6/2008 | Coleman | |
| 7,448,391 B2 | 11/2008 | Funke et al. | |
| 2002/0130067 A1 | 9/2002 | Takai et al. | |
| 2002/0162561 A1 | 11/2002 | Heitmann | |
| 2005/0211257 A1* | 9/2005 | Funke et al. | 131/109.2 |
| 2008/0087583 A1 | 4/2008 | Van de Laak et al. | |

FOREIGN PATENT DOCUMENTS

| | | |
|---|---|---|
| EP | 1188385 | 3/2002 |
| EP | 1576897 | 6/2008 |
| WO | WO 90/06819 | 6/1990 |
| WO | WO 03/090569 | 11/2003 |

* cited by examiner

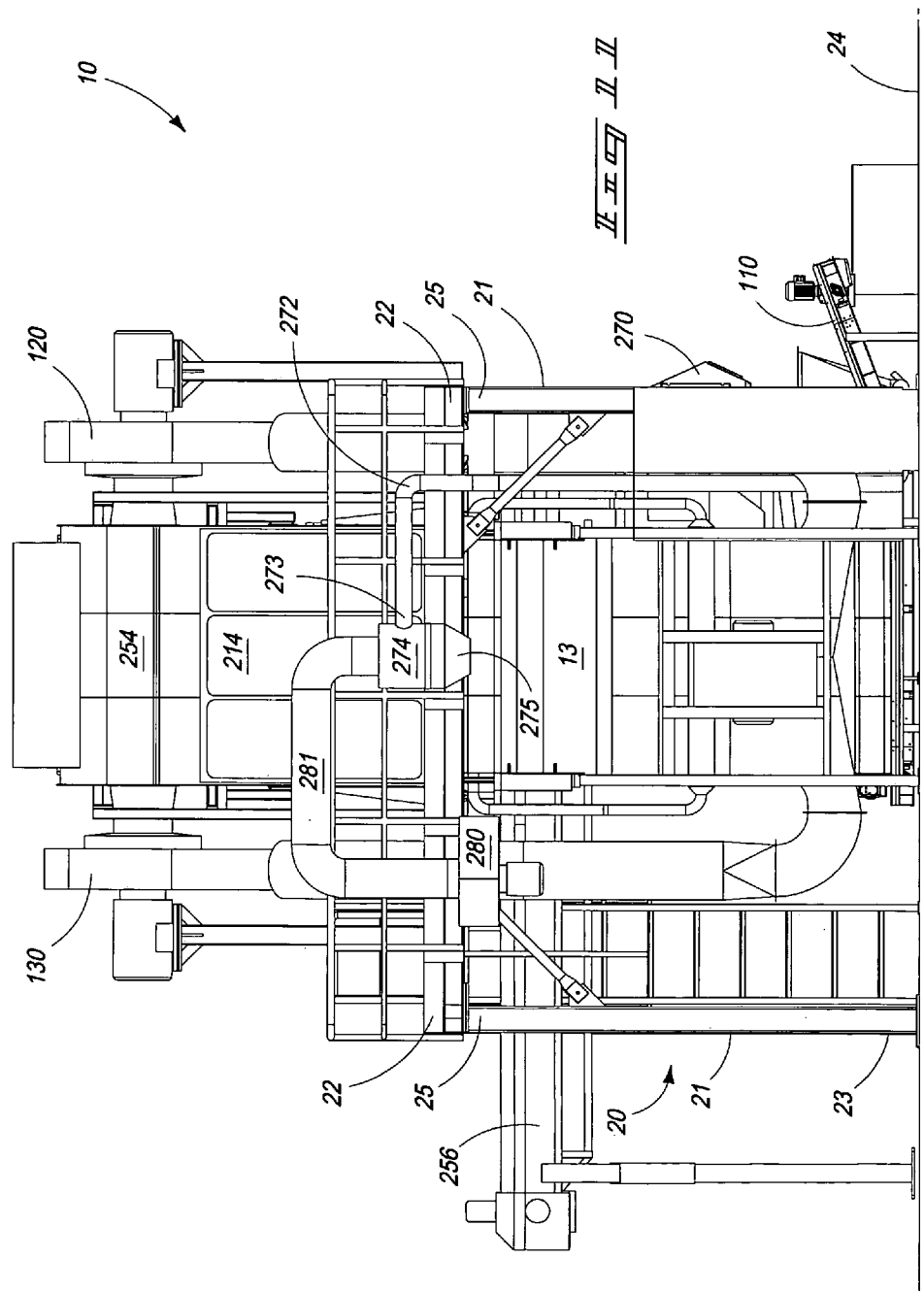

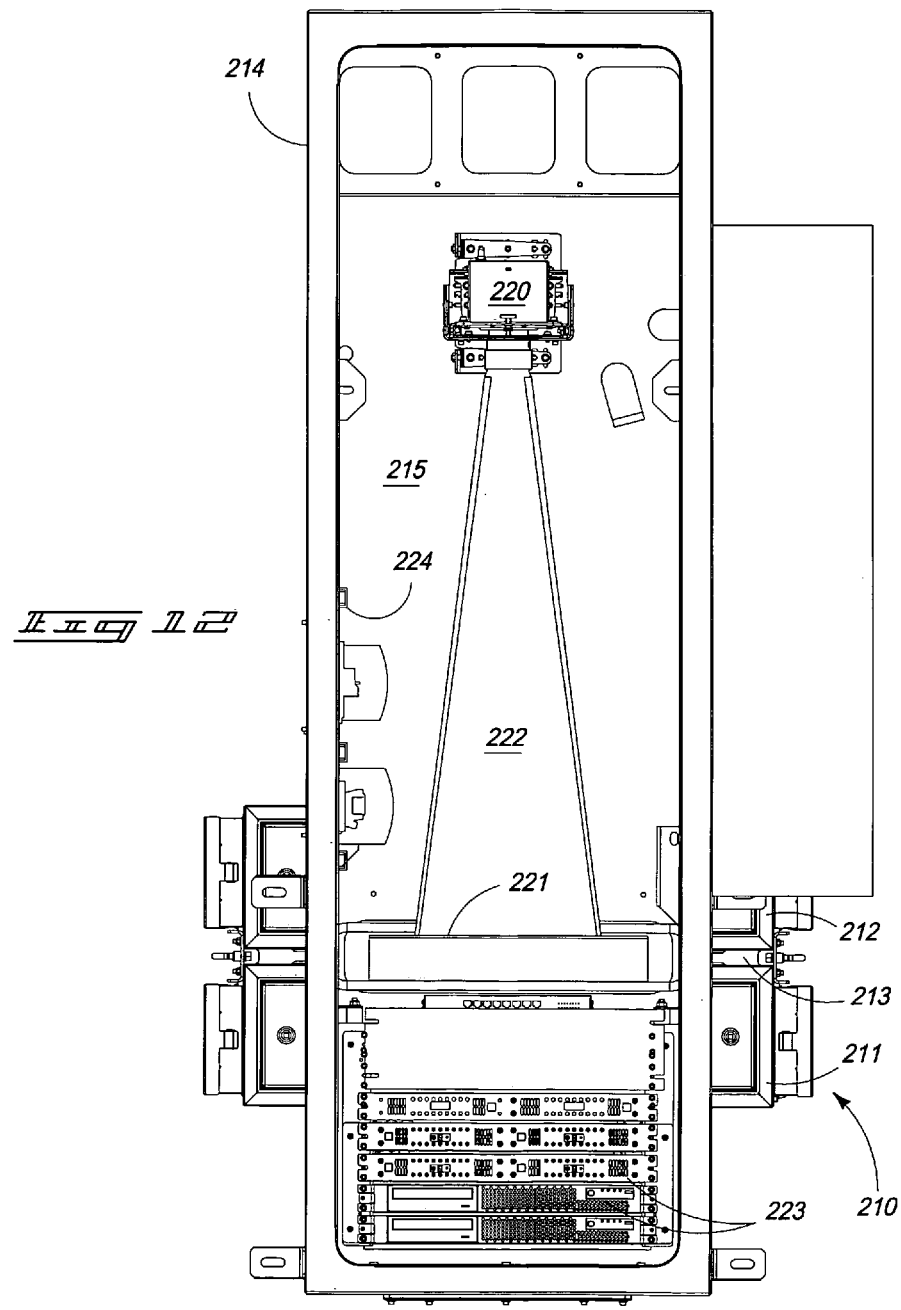

APPARATUS AND METHOD FOR POST-THRESHING INSPECTION AND SORTING OF TOBACCO LAMINA

TECHNICAL FIELD

The present invention relates to an apparatus and method for post-threshing inspection and sorting of tobacco lamina, and more specifically to a device and methodology which is useful for optically inspecting an air stream containing acceptable tobacco lamina which has been produced from a threshing operation, and further identifying and then removing contaminants from the air stream which is carrying the tobacco lamina.

BACKGROUND OF THE INVENTION

The prior art is replete with assorted methodology and apparatus utilized to inspect, sort and thereafter separate contaminants, and other foreign bodies from a product stream such as one containing tobacco lamina, and which has been produced from a threshing operation. Various apparatus and schemes have been proposed relative to the inspection and sorting of tobacco leaves prior to threshing. For example, the Office's attention is directed to U.S. Pat. No. 3,968,366 to Asfour; and U.S. Pat. No. 7,383,840 to Coleman, and which both disclose a machine for scanning tobacco leaves to reject unacceptable, that is, discolored or damaged leaves and other undesirable particles before they are threshed into multiple small pieces. One of the inventors in the present application has disclosed in several earlier US patents, those being, U.S. Pat. Nos. 7,335,847 and 7,448,391, a method and apparatus for foreign body separation from a material flow, and which provides a convenient means whereby a flow of tobacco may be supplied to a foreign body detection device, and thereafter contaminants are removed from the tobacco stream in a convenient and reliable fashion not possible heretofore.

Notwithstanding the various prior art devices and schemes used previously to separate contaminants from a tobacco stream, producers of various tobacco products have continued to try and develop an apparatus and methodology which will increase the quality of the tobacco lamina produced by such sorting devices so as to insure the removal of substantially all contamination from the tobacco stream being inspected.

An apparatus and methodology which avoids the shortcomings attendant with the prior art devices and practices utilized, heretofore, is the subject matter of the present application.

SUMMARY OF THE INVENTION

A first aspect of the present invention relates to an apparatus for the post-threshing inspection and sorting of tobacco lamina which includes a separation conduit having a proximal and a distal end, and an intermediate portion, and further having an internal facing surface which defines an internal cavity extending between the proximal and distal ends; a first source of pressurized air delivered to the proximal end of the separation conduit; a second source of pressurized air delivered to the internal cavity at a location near the intermediate potion of the separation conduit; a conveyor for depositing a source of tobacco lamina and other contaminants into the internal cavity at a location between the proximal and distal ends of the separation conduit, and wherein the first source of pressurized air creates an air stream carrying the tobacco lamina and some contaminants in the direction of the distal end, and the remaining contaminants move, under the influence of gravity toward the proximal end of the separation conduit, and wherein the second source of pressurized air causes the tobacco lamina being carried by the air stream generated by the first source of pressurized air to move away from the internal facing surface of the separation conduit; an inspection station located downstream of the intermediate portion of the separation conduit, and which optically inspects the air stream carrying the tobacco lamina and any contaminants and which identifies defective tobacco lamina and any contaminants in the air stream passing through the inspection station, and generates an electrical signal; and a rejection station operably coupled in signal receiving relation relative to the inspection station and downstream relative thereto, and which ejects the previously identified defective tobacco lamina and any contaminants from the air stream passing through the rejection station.

Another aspect of the present invention relates to an apparatus for the post-threshing inspection and sorting of tobacco lamina which includes a separation conduit having a proximal end, an intermediate portion, and an opposite distal end, and wherein the separation conduit defines an internal cavity which has a variable cross sectional dimension when measured between the proximal and distal ends thereof, and wherein the separation conduit extends generally vertically upwardly; a conveyor for carrying and depositing a source of tobacco lamina and other contaminants into the internal passageway at a location between the intermediate portion, and the proximal end of the separation conduit; an air stream delivery device positioned in air stream delivering relation relative to the proximal end of the separation conveyor, and which, when energized, delivers a stream of air having a given pressure to the proximal end of the separation conveyor, and which further carries the tobacco lamina and some contaminants in the direction of the distal end of the separation conveyor, and wherein some contaminants move in the direction of the proximal end of the separation conveyor; a suction device positioned in air stream removing relation relative to the distal end of the separation conduit, and which, when energized, removes a given volume of the air stream delivered by the air stream delivery device, and which is carrying the tobacco lamina; an inspection station located downstream of the intermediate portion of the separation conduit, and upstream of the distal end thereof, and which optically inspects the air stream carrying the tobacco lamina, and some contamination passing through the inspection station, and identifies both defective tobacco lamina, and remaining contamination in the air stream, and which produces a suitable signal; and a tobacco lamina rejection station located downstream of the inspection station, and in signal receiving relation relative thereto, and is further located upstream of the suction device, and wherein the tobacco lamina rejection station is maintained at substantially ambient atmospheric pressure, and wherein the air stream delivery device and intermediate portion of the separation conduit create an air pressure within the separation conduit which substantially maintains the speed of movement of the tobacco lamina and other contaminants between the inspection station and the tobacco lamina rejection station, and wherein the tobacco lamina rejection station, upon receiving the signal from the inspection station, removes any defective tobacco lamina, and other contaminants from the air stream delivered from the inspection station, and wherein the given volume of the air stream removed by the suction device removes a volume of the air stream carrying acceptable tobacco lamina from the tobacco lamina rejection station at a speed which is substantially equal to the speed at which the tobacco lamina and other contaminants were delivered to the tobacco lamina rejection station.

Still another aspect of the present invention relates to a method for the post-threshing inspection and sorting of tobacco lamina which includes providing a substantially vertically oriented separation conduit defined by an internal sidewall, and which has a proximal and a distal end, and an intermediate portion, and wherein the internal sidewall of the substantially vertically oriented separation conduit further defines an internal passageway extending between the proximal and distal ends; delivering a source of a tobacco lamina, and other contaminants each having given weights, and which have been produced from a threshing operation into the internal passageway at a location which is between the proximal and distal ends of the substantially vertically oriented separation conduit; delivering a first air stream having a given air pressure and volume into the proximal end of the vertically oriented separation conduit, and which is sufficient to carry away tobacco lamina and other contaminants which weigh less than about 0.8 grams/cm$^2$ and in the direction of the distal end of the substantially vertically oriented separation conduit; delivering a second air stream having a given air pressure, and volume, into the internal passageway defined by the substantially vertically oriented separation conduit at a location near the intermediate portion thereof, and wherein the tobacco lamina and other contaminants being carried by the air stream are moved away from internal sidewall of the substantially vertically oriented separation conduit; providing an inspection station located intermediate the proximal and distal ends of the substantially vertically oriented separation tube, and downstream relative to the second air stream, and which visually identifies defective tobacco lamina and other contaminants being carried by the air stream; providing a rejection station which is located downstream of the inspection station, and operably coupling the rejection station with the inspection station; and removing defective tobacco lamina and other contaminants being carried by the air stream in the rejection station.

These and other aspects of the present invention will be described in greater detail hereinafter.

BRIEF DESCRIPTION OF THE DRAWINGS

Preferred embodiments of the invention are described below with reference to the following accompanying drawings.

FIG. 11 is a fourth side elevation view of the present invention which is taken from a position opposite to that seen in FIG. 10.

FIG. 12 is a perspective, fragmentary view of an optical imaging device employed with the apparatus of the present invention, and which forms a feature of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
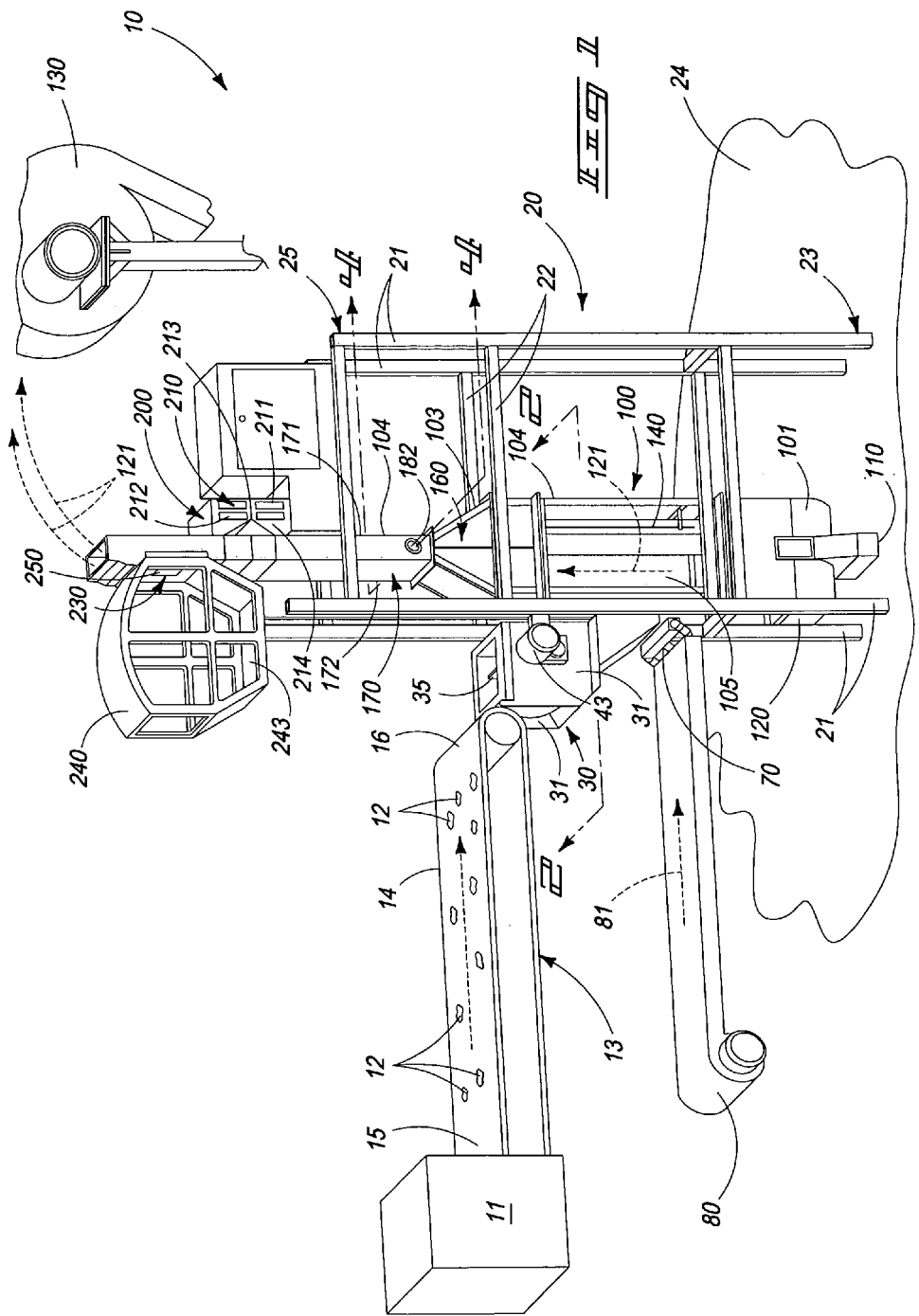
FIG. 1 is a greatly simplified schematic, side-elevation view of one form of the apparatus of the present invention with some surfaces and structures removed to illustrate the structure thereunder.

The present invention is best understood by a study of FIG. 1. The invention is employed for the post-threshing inspection and sorting of tobacco lamina. In this regard, the apparatus, which is generally indicated by the numeral 10, is positioned in downstream product receiving relation relative to a threshing operation which is generally indicated by the numeral 11. As should be understood by the those who are skilled in the art, a threshing operation generally receives a source of whole tobacco leaves and thereafter physically manipulates or treats them in a manner so as to fragment the tobacco leaves into individual parts or small pieces. These parts or pieces include the very thin, lightweight tobacco lamina portion, and other undesirable parts or contaminants such as stems, veins, and other woody portions that might have become mixed in with the tobacco leaves, or were derived from the respective leaves, during the threshing operation 11. Therefore, the threshing operation 11 produces a source of post-threshed tobacco lamina and other contaminants which are generally indicated by the numeral 12, and which is deposited on a first conveyor which is indicated by the numeral 13. The first conveyor has an upwardly facing supporting surface 14, and is operable to transport the source of post-threshed tobacco lamina and other contaminants 12 from the intake end 15 thereof, to the discharge or exhaust end 16 where the source of post-threshed tobacco lamina, and other contaminants 12, is deposited, by means of gravity, within an air lock which will be described in greater detail, below. Of course, other means for transporting the tobacco lamina to the air lock could be employed with equal success.

Figure 6:
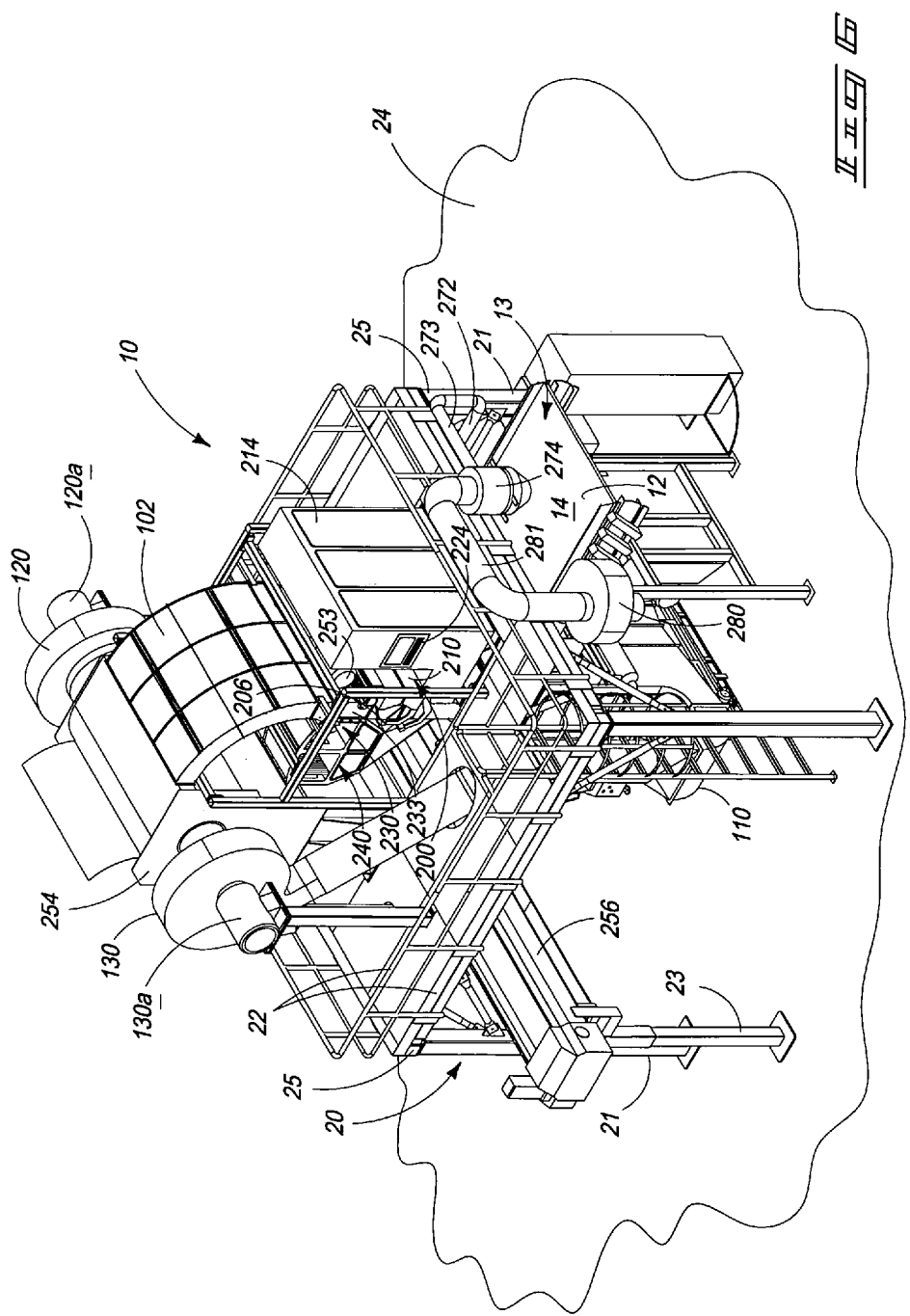
FIG. 6 is a perspective side elevation view of the apparatus of the present invention.

Referring still to FIGS. 1 and 6, it will be seen that the apparatus of the present invention 10 generally includes a support frame 20 which locates the apparatus in a generally vertical orientation. The support frame 20 comprises a multiplicity of generally vertically oriented frame members 21 which are interconnected together by a plurality of horizontally oriented bracing or other frame members 22. The support frame has a bottom end or portion 23 which is affixed on, or otherwise attached to, a supporting surface such as the surface of the earth, or a factory floor, or the like. Still further, the same support frame 20 has a top portion or upper end 25. The apparatus 20 is generally supported on, or otherwise affixed to given locations along the support frame 20.

Figure 2:
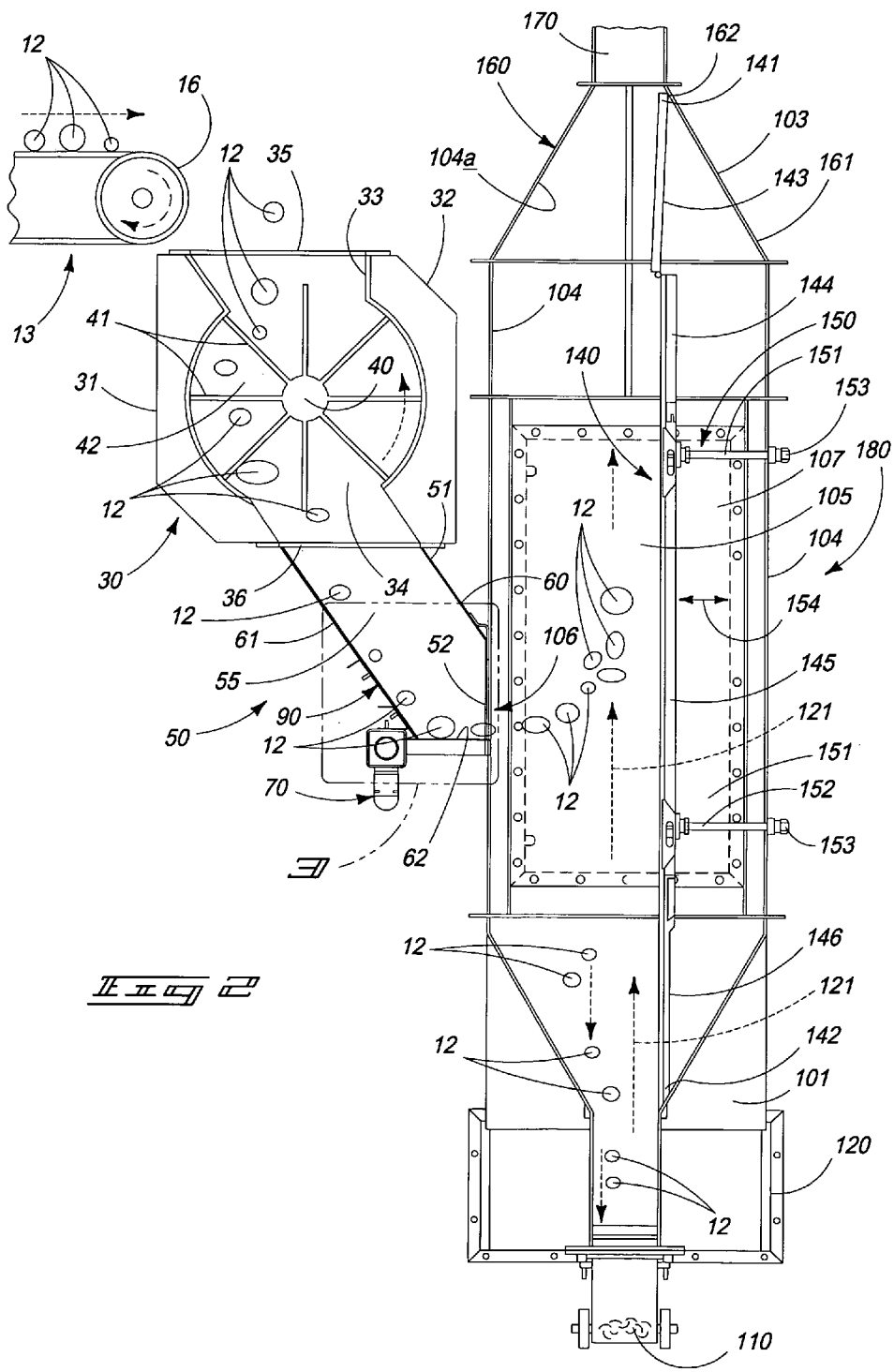
FIG. 2 is a somewhat simplified transverse, vertical, sectional view taken through a portion of the apparatus of the present invention as seen in FIG. 1 and along the line labeled 2-2.

Referring more specifically to FIGS. 1 and 2, it will be seen, in one form of the invention, that the apparatus 10 includes an in-feed air lock which is generally indicated by the numeral 30. This in-feed air lock joins or otherwise operably couples together an adjacent separation conduit, which will be discussed in greater detail hereinafter, and the first conveyor 13 for carrying and depositing the source of tobacco lamina and other contaminants 12. The in-feed air lock 30 is defined by a housing 31 which is fastened on the earlier described vertically oriented frame members 21 at a location somewhere between the bottom portion 23, and the top portion 25 of the support frame 20. Referring now to FIG. 2, it will be understood that the in-feed air lock 30 is of substantially conventional design. The housing 31 has an outside wall 32, and an opposite inside wall 33, which defines a passageway 34 which extends between an intake aperture 35, and an exhaust aperture 36. As seen in FIG. 2, and located intermediate the intake aperture 35, and the exhaust aperture 36 is a rotatable feeding or intake wheel 40. The rotatable feeding or intake wheel includes a plurality of spaced, radially extending paddles or arms 41. A plurality of cavities 42 are defined between the respective radially extending paddles or arms 41, and are individually operable to receive the source of post-threshed tobacco lamina and other contaminants 12 which are delivered by the first conveyor 13, and deposited by gravity into the intake aperture 35 from the discharge or exhaust end 16 of the first conveyor 13. The rotatable feeding or intake wheel 40 is rotated in a given direction by means of a motor 43 (FIG. 1) which is mounted on the housing 31. The motor 43 is selectively energized so as to rotate the rotatable feeding wheel 40 in a given direction which is effective to deposit the source of post-threshing tobacco lamina and other contaminants 12 into a sliding chute which will discussed in the paragraphs which follow.

Figure 3:
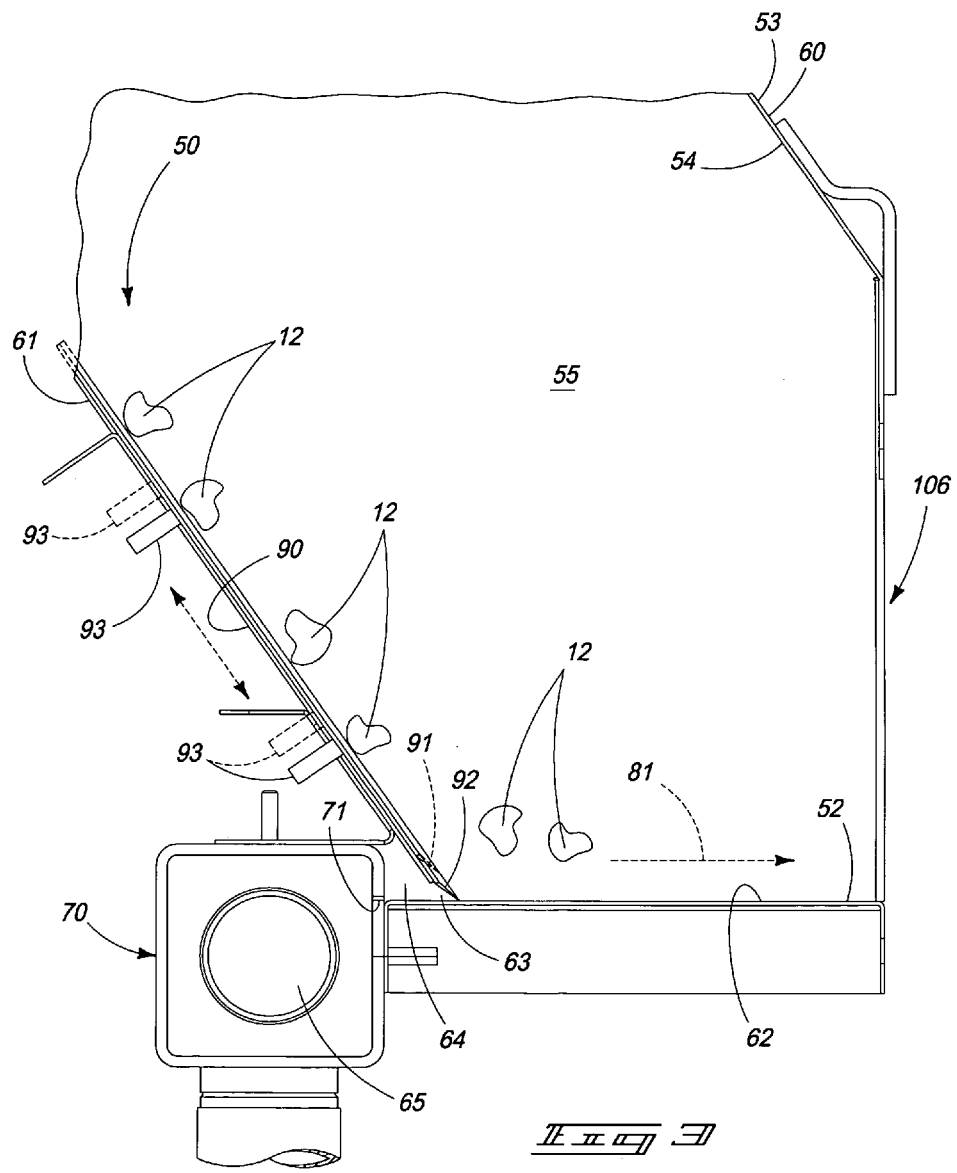
FIG. 3 is a fragmentary, enlarged, transverse, vertical, sectional view of the present invention, and which is taken from a location labeled 3 in FIG. 2.

Referring now to FIGS. 2 and 3, it will be seen that the in-feed air lock 30 and more specifically the exhaust aperture 36 thereof is coupled in feeding relation relative to a sliding or delivery chute which is generally indicated by the numeral 50. The sliding or delivery chute 50 is oriented in an angulated relationship relative to the in-feed air lock 30, and further has a first end 51 which is affixed to the outside wall 32 of the housing 31, and an opposite, second or exhaust end 52. Still further, the sliding or delivery chute 50 has an outside facing surface 53 (FIG. 3), and an opposite, inside facing surface 54, which defines an internal passageway 55 extending between the first end 51, and the opposite, second end 52. The internal passageway 55 receives the source of post-threshed tobacco lamina, and other contaminants 12, and which have been previously delivered to the in-feed air lock 30 by means of the first conveyor 13. As seen most clearly by reference to FIG. 3, the sliding or delivery chute 50, has a top or front facing sidewall 60; and a back, or rear facing sidewall 61. Still further, the back sidewall 61 is located adjacent to a bottom sidewall 62. However, as seen in FIG. 3, it will be noted that the back sidewall 61 is spaced from the bottom sidewall 62. This spatial relationship defines a slit, gap or space 63, therebetween. This gap, slit or space 63 defines an aperture 64 which is coupled to an adjacent air passageway which is generally indicated by the numeral 65. The air passageway 65 is mounted in fluid flowing relation relative to an air manifold that is indicated by the numeral 70, and which is mounted adjacent to the bottom sidewall 62. The air manifold 70 defines a multiplicity of air exhaust ports 71. Still further, a fan 80 of conventional design (FIGS. 1 and 9) is coupled to the air manifold 70, and supplies an air stream 81 which enters the air manifold 70 and thereafter escapes through the air exhaust ports 71. The air stream 81 travels along the air passageway 65, and through the gap, slit or space 63 and into the internal passageway 55 of the sliding or delivery chute 50. This air stream 81 is operable to engage the source of post-threshed tobacco lamina and other contaminants 12 which has been delivered to the sliding delivery chute 50 and which previously traveled to the second end 52 of the sliding delivery chute 50 under the influence of gravity. Upon engaging the tobacco lamina and other contaminants, the air stream 81 prevents the sedimentation or collection of the tobacco lamina or other contaminants on the bottom sidewall 62, and causes the tobacco lamina and other contaminants 12 to generally move or be blown along a parabolic path of travel (FIG. 2), which is generally indicated by the numeral 82, out of the second end 52 of the sliding or delivery chute 50, and into the separation conduit which will be described, hereinafter. This is seen most clearly by reference to FIG. 2.

Referring now to FIG. 3, it will be seen in this form of the invention 10 that the sliding or delivery chute 50 further includes an adjustable or slideable door 90 which is mounted near the second end 52 of the sliding or delivery chute 50. The adjustable sliding door is operable to be placed in selectively occluding relation relative to the slit, gap or space 63 which is defined between the back sidewall 61, and the bottom sidewall 62 thereof. As seen from the drawings, the adjustable slideable door is moveable between a first position 91, and a second position 92. In the second position 92 the adjustable/slideable door 90 substantially occludes the aforementioned slit, gap or space 63. As will be appreciated by those skilled in the art, posts 93 are provided, and mounted on the adjustable/slideable door 90. These posts 93 allow an operator to selectively move the adjustable/slideable door to given positions between the first and second positions 91 and 92 so as to control the amount of the air stream 81 which is supplied into the internal passageway 55, and which creates the parabolic path of travel 82 for the tobacco lamina and other contaminants 12 which has been previously received at the second end 52 of the sliding or delivery chute 50.

Referring now to FIG. 1, the apparatus 10 of the present invention, as discussed above, further includes a separation conduit 100 which is mounted in a fixed location relative to the surface of the earth 24 by means of the support frame 20. The separation conduit 100 has a proximal or first end 101; a second or distal end 102 (FIGS. 5 and 6); and an intermediate portion 103 (FIG. 1) located between the proximal and distal ends 101 and 102. The separation conduit 100 is defined by a multiplicity of sidewalls 104 each having an inside facing surface 104A (FIG. 2). The inside facing surfaces of the multiplicity of sidewalls 104 define an internal cavity 105 which has a variable cross-sectional dimension when measured between the proximal and distal ends 101 and 102 thereof. As seen in FIG. 1, the separation conduit 100 extends generally vertically upwardly, and is held in that location by the support frame 20. As will be recognized by a study of FIG. 2, an aperture 106, having given dimensions, is formed in one of the sidewalls 104, and thereby allows the internal cavity 105 to communicate or be coupled with the second end 52, of the sliding or delivery chute 50. Through the aperture 106, the tobacco lamina or other contaminants 12 move along the parabolic path of travel 82 as seen in that drawing. As further seen in FIG. 2, a transparent window 107 is removably mounted on the separation conduit 100, and is located between the proximal or first end 101, and the intermediate portion 103. This window allows an operator to view into the internal cavity 105, and thereafter make adjustments to the operation of the apparatus 10 as will be discussed in greater detail, hereinafter.

As seen best by reference to FIGS. 1 and 2, a removable contamination collection container or assembly 110 is mounted near the proximal or first end 101 of the separation conduit 100 and is operable to collect heavier contaminants which move in the direction of the proximal end 101 of the separation conduit 100, under the influence of gravity, and against the direction of an air stream which is delivered into the separation conduit. The contaminants which move under the influence of gravity typically have a weight of greater than about 0.8 grams/cm$^2$. These heavier contaminants are then periodically removed from the separation conduit 100 by an operator. Additionally, it will be seen in FIG. 9 that an air stream delivery device 120 is positioned in air stream delivering relation relative to the proximal end 101 of the separation conveyor 100 and which, when energized, delivers an air stream 121 (FIGS. 1 and 2) having a given pressure and speed, to the proximal end 101 of the separation conveyor 100. The air stream 121 is operable to carry the tobacco lamina, and some lighter weight contaminants 12 in the direction of the distal end 102 of the separation conduit 100. As discussed above, some heavier contaminants move in the opposite direction and forward the proximal end 101 of the separation conduit 100, and are thereby received in the removable collection container 110. Additionally, it will be seen from a study of FIGS. 1 and 6 that a suction device, which is generally indicated by the numeral 130, and which is depicted herein as a conventional fan, is positioned in air stream 121 removing relation relative to the distal end 102 of the separation conduit 100. The suction device 130, when energized, removes a given volume of the air stream 121 which is delivered by the air stream delivery device 120, and which is carrying the tobacco lamina generally vertically from the proximal end 101 to the distal end 102. The respective air stream delivery device 120, and suction device 130, are each energized by motors 120A and 130B, respectively, to effect the aforementioned delivery and removal of the air stream 121 from the separation conduit 100.

In the present invention, the velocity of the air stream 121 is about 3 to about 8 meters/second. Still further, it will be understood from the arrangement as seen in the drawings, that the intermediate portion 103 of the separation conduit 100 increases the air stream 121 velocity as the air stream 121 moves in a direction from the proximal end 101, to the distal end 102 of the separation conduit 100. In the arrangement as seen in the drawings, the individual post-threshed tobacco lamina and other contaminants 12 carried by the air stream 102 each have a weight of typically less than about 0.8 grams/cm$^2$. As earlier discussed, and as seen in FIG. 2, the contaminants which move in the direction of the proximal end 101 of the separation conduit 100 move under the influence of gravity, and against the direction of the air stream 121. These contaminants typically have a weight of greater than about 0.8 grams/cm$^2$. Therefore, as seen in FIGS. 1 and 2, it will be understood, that an in-feed air lock 30 is provided, and which is joined to the separation conduit 100, and located in receiving relation relative to the conveyor 13, and which is further operable for carrying and depositing the source of tobacco lamina and other contaminants 12 within the separator conduit 100. Still further, a sliding or delivery chute 50 is provided, and which couples the in-feed air lock 30 and separation conduit 100 together. In the arrangement as earlier described, the tobacco lamina and other contaminants 12 provided by the conveyor 13 are delivered by the in-feed air lock 30 into the delivery chute 50. Further, an air stream or source of pressurized air 81 is supplied to the sliding or delivery chute 50, and which is effective to propel the tobacco lamina and other contaminants 12 out of the sliding or delivery chute 50 and along a trajectory or parabolic path of travel 82 into the separation conduit 100 as depicted in FIG. 2. As the tobacco lamina and other contaminants 12 travel along the aforementioned path of travel, the heaviest contaminants (described above) move under the influence of gravity and in the direction of the proximal end 101, and are then collected in the container 110.

Still referring to FIG. 2, it will be seen that the apparatus 10 includes a selectively moveable wall 140 which is mounted within the internal cavity 105 of the separation conduit 100. This selectively moveable wall 140 is located between the proximal end 101, and the intermediate portion 103, and which further, when selectively moved, adjusts the speed of the air stream 121 which is supplied by the air stream delivery device 120. The selectively moveable wall 140 has a first hingedly mounted end 141, and an opposite, second, hingedly mounted end 142. The selectively moveable wall includes first, second, third and fourth portions 143, 144, 145 and 146, respectively. As seen in the drawings, the respective portions are serially, hingedly, mounted together. It will be noted from the drawings, that the selectively moveable wall 140 is oriented in an appropriate, predetermined location relative to the internal cavity 105 of the separation conduit 100, by means of several threaded adjustment rods 150. As seen in FIG. 2, there is a first and a second rod 151 and 152, which are depicted, and which are individually affixed to the third portion 145. These respective rods are threadably engaged by individual threaded fasteners 153 which allow the respective rods to be selectively threadably advanced or withdrawn relative to various locations within the internal cavity 105. As will be seen in FIG. 2, the selectively moveable wall 140 moves under the influence of the respective rods 151 and 152 along a path of travel 154. An operator, by adjusting the length that the respective rods 150 extend into the cavity 105, may effect a change in the speed of the air stream 121 moving through the internal cavity 105 by either making the internal cavity smaller or larger. By means of this adjustment, the air speed 121 is made effective and optimal for carrying the tobacco lamina 12 to be sorted to a downstream inspection station which will be discussed in greater detail, hereinafter, and further avoids the use of costly motor speed control arrangements for use on the motors 120A and 130A, respectively.

Referring still to FIGS. 1 and 2, the present separation conduit 100 includes a venturi section 160 which is located generally at the intermediate portion 103 thereof. The venturi section 160 has a first end 161 having a first cross-sectional dimension, and a second end 162, which is spaced from the first end 161, and which has a second cross-sectional dimension which is less than the first cross-sectional dimension. The effect of the venturi section 160 is to increase the speed of the air stream 120 carrying the tobacco lamina and the light weight contaminants 12 that are to be inspected.

Figure 4:
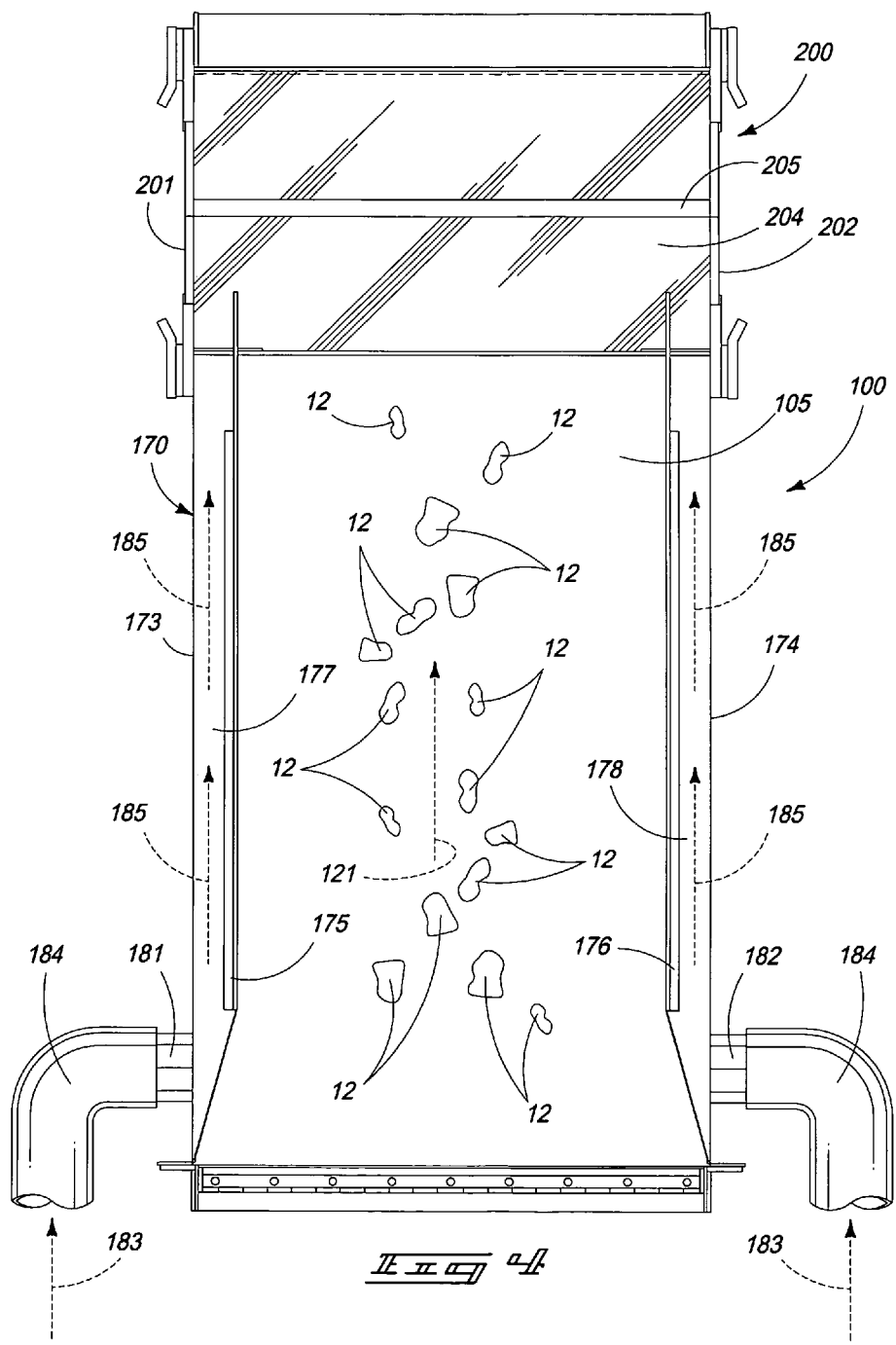
FIG. 4 is an enlarged fragmentary, vertical, side elevation view of the present invention, and which is taken from a position labeled 4-4 as seen in FIG. 1.

Referring now to FIGS. 1 and 4, positioned downstream relative to the venturi section 160, and upstream of the inspection station which will be discussed, is the guide portion 170 of the separation conduit 100. More specifically, the guide portion 170 comprises first and second sidewall surfaces 171 and 172 which are located in spaced relation one relative to the other, (FIG. 1); and third and fourth sidewall surfaces 173 and 174 (FIG. 4), which are located in predetermined spaced relation one relative to the other, and which individually join the first and second sidewall surfaces 171 and 172 together so as to form a portion of the internal cavity 105. The guide portion 170 is substantially rectangular in shape (FIG. 4). Additionally, located within this guide portion 170 it will be seen that a first guide plate 175 is mounted in the internal cavity 105, and on the third sidewall 173 and between the first and second sidewall surfaces 171 and 172, respectively; and a second guide plate 176 is mounted in the internal cavity 105, and on the fourth sidewall 174 between the first and second sidewall surfaces 171 and 172, respectively. As clearly seen in the drawings, a first space 177 is defined between the first guide plate 175, and the third sidewall 173; and a second space 178 is defined between the second guide plate 176, and the fourth sidewall 174. Still further as seen in FIG. 4, first and second air injection ports 181 and 182 are formed in the third and fourth sidewalls 173 and 174, respectively, and a source of compressed air 183 (FIG. 8) previously generated by the fan 80, is delivered by means of the conduit 184 to each of the air injection ports 182. The source of compressed air 183 forms an air stream 185 (FIG. 4) which is delivered to and moves along within the first and second spaces 177 and 178 as indicated by the arrows in that drawing. The air stream 185 provides a means by which the product to be inspected, that being, the tobacco lamina and any remaining contaminants 12 are centered substantially centrally relative to the internal cavity 105. This centering of the product to be inspected permits a complete viewing of the product when it arrives within the inspection station which is located downstream relative to the guide portion 170, and substantially prevents any defects from becoming oriented in "blind corners" where it cannot be imaged by the camera which will be described in greater detail, below. As should be understood, the speed of the air stream 121 which is transporting the tobacco lamina and other contaminants 12 at this point in the separation conduit 100 is adjustable from approximately 20-22 meters per second.

Figure 5:
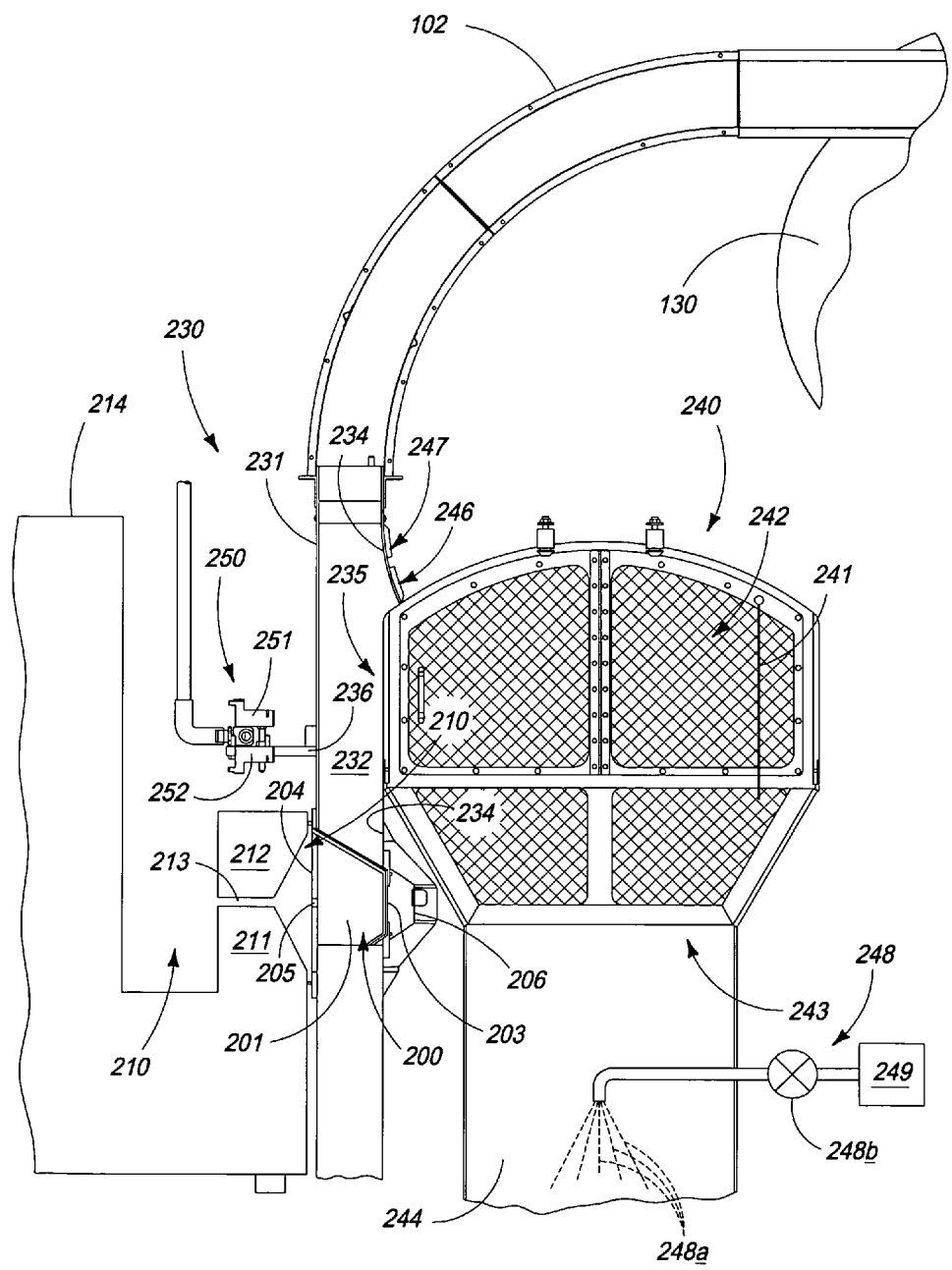
FIG. 5 is a greatly simplified, partial, vertical, sectional view of a portion of the present invention.
Figure 7:
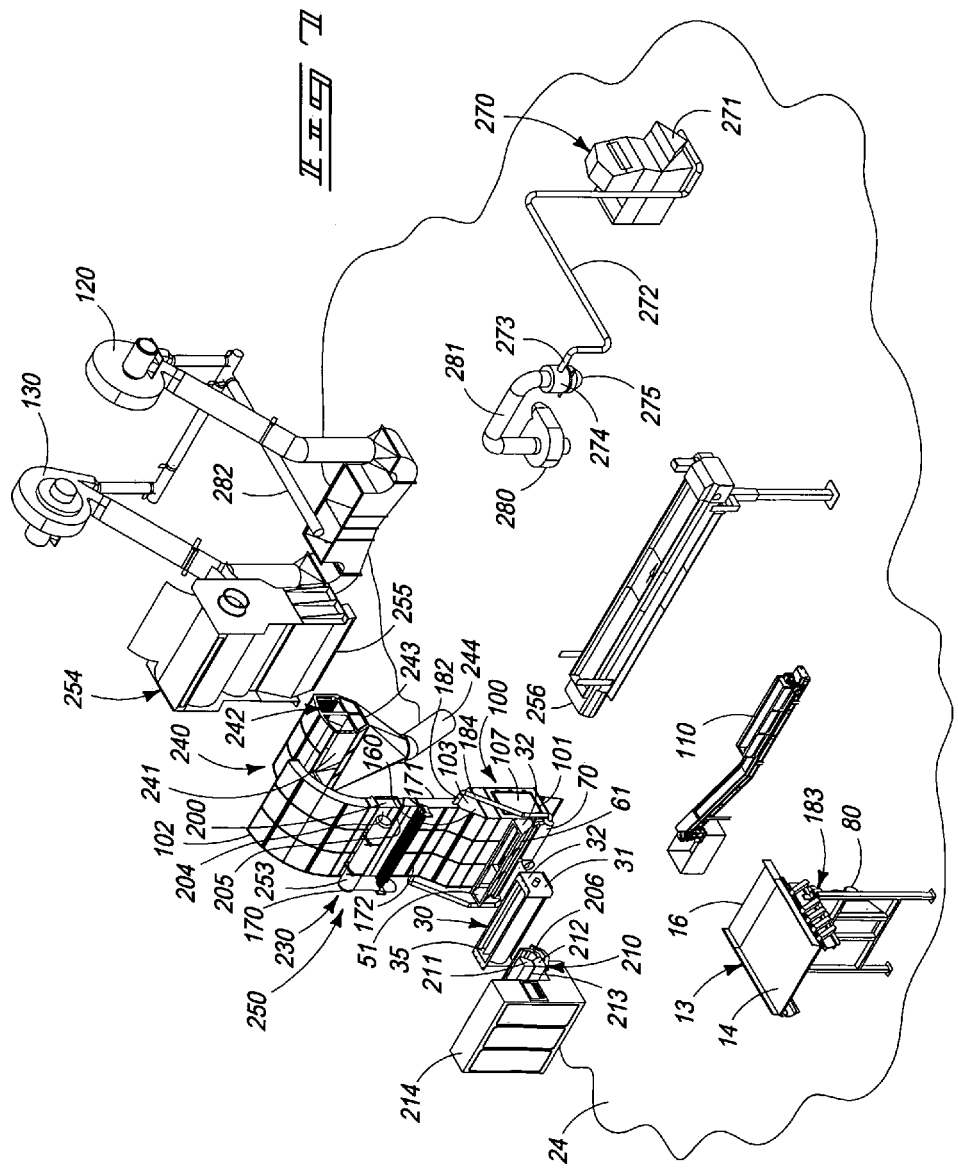
FIG. 7 is a fragmentary, exploded, perspective side elevation view of the apparatus of the present invention.
Figure 8:
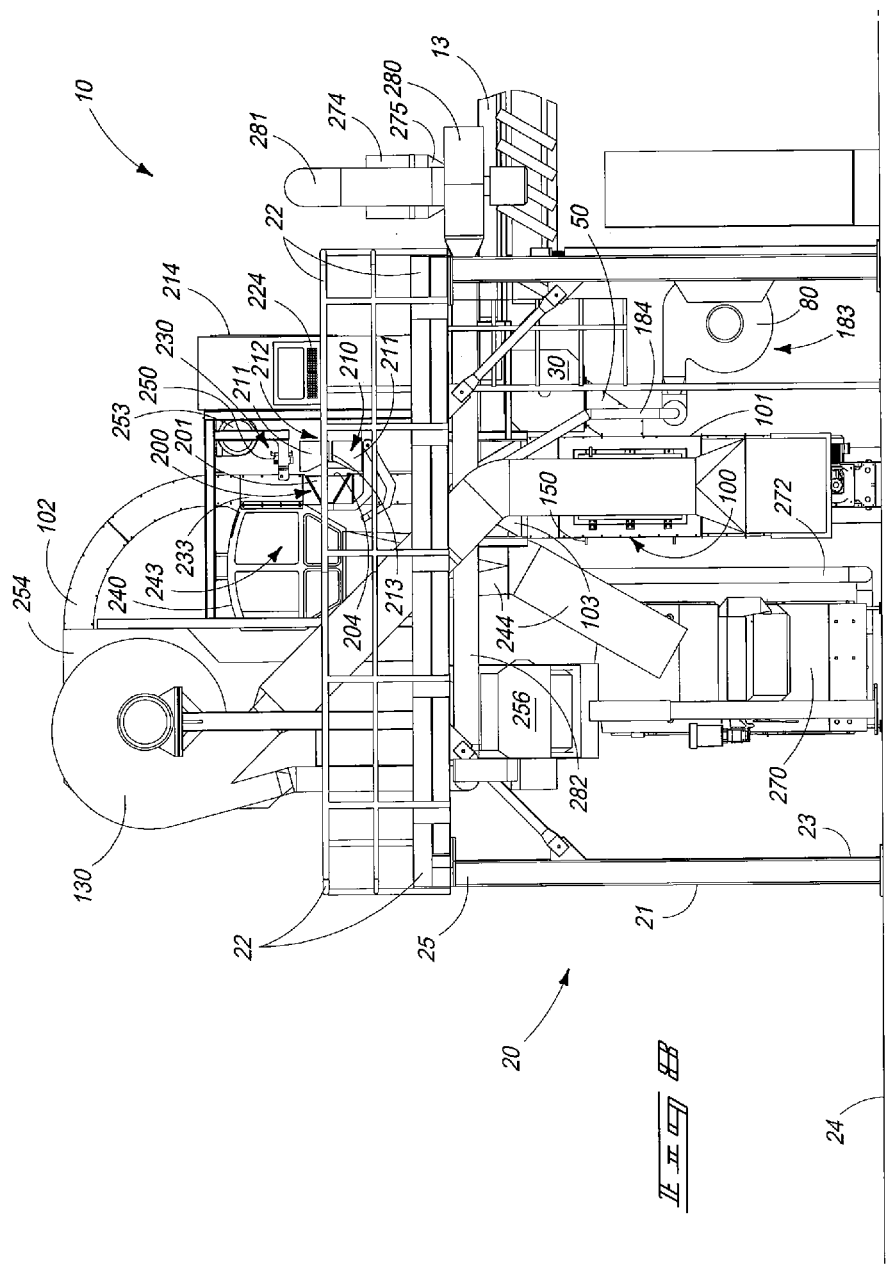
FIG. 8 is a first side elevation view of the apparatus of the present invention.
Figure 9:
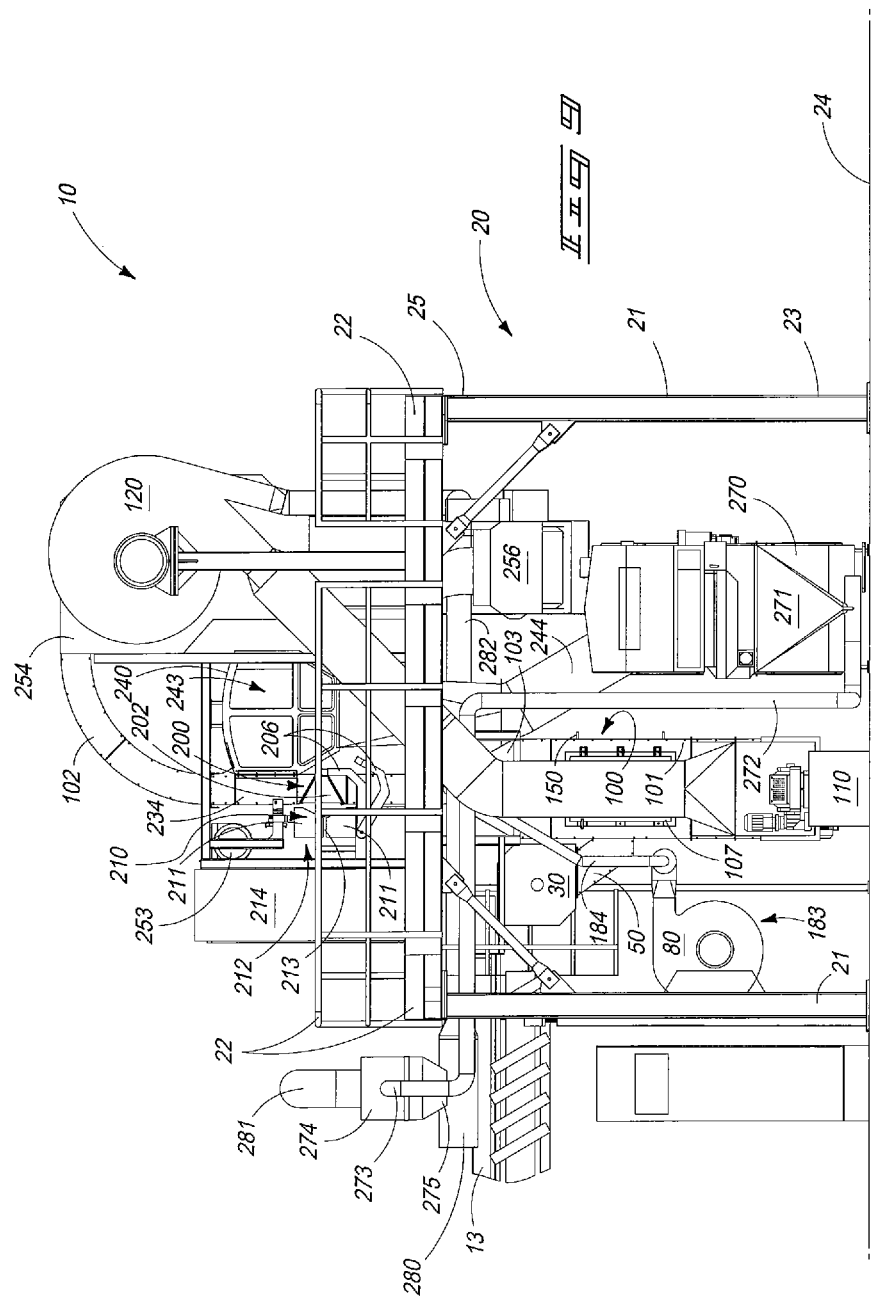
FIG. 9 is a second side elevation view of the apparatus of the present invention, and which is taken from a position opposite to that seen in FIG. 8.

Referring now to FIGS. 5, 7, 8 and 12, an inspection station which is generally indicated by the numeral 200 is located downstream of the intermediate portion 103 of the separation conduit 100, and upstream of the distal end 102 thereof. The inspection station 200 is rendered operable to optically inspect the air stream 121 carrying the tobacco lamina and the light weight contamination 12 passing through the inspection station 200. The inspection station identifies both defective or unacceptable tobacco lamina, and any remaining light weight contamination in the air stream 121, and further produces a suitable electrical sorting signal which is appropriate for what has been optically inspected. The inspection station 200, as seen in the drawings, is formed of optically transparent first; second; third; and fourth sidewalls which are generally indicated by the numerals 201; 202; 203; and 204, respectively. As seen most clearly by reference to FIG. 5, a slit or opening 205 is formed in the fourth sidewall 204, and which permits an optical viewing assembly, such as a camera, to view or optically image therethrough. The details of the optical viewing assembly will be discussed in greater detail in the paragraphs which follow. Still further, as seen in FIG. 5, a backlight assembly 206 is shown mounted in a location adjacent to the inspection station 200 and which is operable to generate visible light which passes through the transparent third side wall 203 to illuminate the tobacco lamina, and other contamination 12 which is passing through the inspection station 200. This backlight assembly is pivotally moveable away from the inspection station 200 (FIG. 9). This pivotal movement permits an operator to gain access to the inspection station 200 so as to remove, and periodically clean or maintain the inspection station so as to ensure proper imaging of the product which is passing therethrough. It should be noted that the transparent walls 201, 202 (FIG. 9), 203 and 204 which forms this portion of the inspection station 200 is generally trapezoidal in shape when viewed, for example, in FIG. 5. This shape allows for the convenient removal of this portion of the inspection station portion 200 so that it may be conveniently serviced and cleaned periodically by the operator of the apparatus 10.

Mounted closely adjacent to the transparent fourth wall 204 of the inspection station 200 is an illumination source 210 which, when energized, emits visible light which passes through the optically transmissive inspection station 200, or portion of the separation conduit 100 so as to illuminate the source of tobacco lamina and other contaminants 12 passing therethrough. More specifically, the illumination source 210 includes a first bank of high intensity discharge lamps 211; and a second bank of similar, high intensity discharge lamps 212. As seen in the drawings, the specific illumination sources 211 and 212 are angled relative to the inspection station 200. Still further, a gap or slit 213 is defined between the first and second banks of lamps 211 and 212, respectively. The gap or slit 213 permits light reflected from the tobacco lamina or other contaminants passing through the inspection station 200 to be reflected back through the substantially coaxially aligned openings 205 which is formed in the side wall 204, and the slit 213, so that the reflected light may be optically imaged by an optical viewing assembly which will be discussed, hereinafter.

Mounted closely adjacent to the illumination source 210 is an optical and electrical equipment housing which is generally indicated by the numeral 214, and which is best seen and understood by reference to FIG. 12. This housing encloses an optical viewing assembly, which is more fully disclosed below. The optical and electrical equipment housing 214 defines an internal cavity 215 which mounts a suitable camera 220 at a given location within the internal cavity 215, and which has a focal length in the present form of the invention of about 105 mm. Mounted within the internal cavity 215 is also a mirror 221 which is operable to receive the reflected light coming from the inspection station 200, and which has passed previously through the gap or slit 213 formed between the first and second banks of lamps 211 and 212. This mirror 221 reflects this same light, which has been reflected from the tobacco lamina and other contaminants 12 passing through the inspection station 200, and in the direction of the camera 220 where it may be received, imaged, and produce a suitable electrical image signal. This reflected light beam passes through the region 222 as shown in FIG. 12. Mounted within the internal cavity 215 of this optical and electrical equipment housing 214 is a suitable computer 223 which is coupled in electrical image signal receiving relation relative to the camera 220. Once received, the computer is operable to send a suitable electrical sorting signal to a reject station which is mounted downstream relative to the inspection station 200, and which will be discussed in greater detail, hereinafter. Electrically coupled to the computer 223 is a graphic user interface, or operator input device 224, and which is best seen by reference to FIG. 8. This graphic user interface/operator input device allows an operator to adjust the operation of the inspection station 200, and other operational aspects of the apparatus 10. Because of the previous action of the guide portion 170 which is effective to move the tobacco lamina and other contaminants 12 to the center portion of the internal cavity 105 of the separation conduit 100, the camera 220 is operable to substantially image the entire source of tobacco lamina, and other contaminants 12 passing through the inspection station 200. The present arrangement substantially prevents tobacco lamina and other contamination 12 from hiding or otherwise passing into regions or areas of the internal cavity 105 where it may not be effectively optically imaged. Therefore, in the arrangement as seen in FIG. 12, the present apparatus 10 provides a camera 220 which is focused on the illuminated tobacco lamina and other contaminants 12 passing through the optically transmissive inspection station or portion 200 of the separation conduit 100 so that defective or otherwise unacceptable tobacco lamina or other contaminants may be optically imaged by the camera, and then effectively identified as contaminants or as unwanted material that needs to be removed from the product stream, by the computer 223, in a manner well understood in the art.

Referring now to FIG. 1, and following, it will be seen that the apparatus 10 includes a tobacco lamina and/or contaminant reject station which is generally indicated by the numeral 230, and which further is located downstream of the previously described inspection station 200, and is additionally coupled in electrical sorting signal receiving relation relative thereto. More specifically, the computer 223 is coupled in controlling relation relative to the reject station 230. As seen in the drawings, the tobacco lamina reject station 230 is further located upstream of the suction device 130. The tobacco lamina reject station 230 is maintained at substantially ambient atmospheric pressure, and the air stream delivery device 120, and the intermediate portion 103 of the separation conduit 100 create an air speed and pressure within the separation conduit 100 which substantially maintains the speed of movement of the tobacco lamina and other contaminants 12 as they move between the inspection station 200, and the tobacco lamina reject station 230 which is located downstream relative thereto. The tobacco lamina reject station 230 upon receiving the electrical sorting signal generated by the computer 223 in the inspection station 200 is effective in removing any defective tobacco lamina, and other contaminants 12, from the air stream 121 which is delivered from the inspection station 200. The suction device 130, previously described, removes a volume of the air stream 121 carrying acceptable tobacco lamina from the tobacco lamina reject station 230 at a speed which is substantially equal to the speed at which the tobacco lamina and other contaminants 12 were delivered to the tobacco lamina reject station 230. In this regard, the volume and velocity of the air stream 121, in the reject station 230 is about 20 meters/second to about 27 meters/second. Still further, in the arrangement as shown in the drawings, it should be understood that the air stream 121 produces an air pressure within the internal cavity 105 of the separation conduit 100 between the proximal and distal ends 101 and 102 thereof. The air pressure as measured at the inspection station 200 is not greater than about 1 hPa, the air pressure as measured at the tobacco lamina reject station 230.

The tobacco lamina reject station 230 is defined, at least in part, by first, second, third and fourth walls 231-234, respectively. As seen most clearly by reference to FIG. 5, an opening 235 is formed in the fourth wall 234, and which communicates with the ambient environment. Still further, a smaller opening 236 is formed in the first wall 231. Referring still to FIG. 5, it will be seen that the apparatus 10 includes a reject container 240 which is maintained at substantially ambient atmospheric pressure, and which is further defined by a plurality of foraminous sidewalls 241 which together, in combination, define an internal expansion chamber or cavity 242 for receiving rejected tobacco lamina, or other contaminants 12 which have been previously indentified, and then ejected from the tobacco lamina reject station 230 based upon the electrical sorting signal that has been received from the computer 223 which is located in the inspection station 200. In this regard, the reject container 240, which is maintained at substantially ambient atmospheric pressure, includes a discharge opening 243 which allows rejected tobacco lamina or other contaminants 12 to move, under the influence of gravity, through the discharge opening 243, and be received in a discharge conduit 244. The discharge conduit transports the defective tobacco lamina, and any other contaminants 12, away from the reject container 240, and then supplies it to a second optical inspection device which will be discussed in greater detail, hereinafter (FIG. 8). An aperture 246 is formed in the wall 234 near the location where the wall 234 joins the reject container 240. Further, the aperture 246 may be selectively occluded by a door or covering 247. By the selective occlusion of the aperture, an operator may substantially prevent a back pressure from developing which might be effective in removing or drawing in previously ejected contaminants back into the air stream 121 from the reject container 240, and which is maintained at substantially ambient pressure. As seen in FIG. 5, another air manifold 248 is provided and which injects an air stream 248A into the conduit 244. This air stream 248A is used to purge defective tobacco lamina received in the container 240 and which otherwise may be caught in an air eddy which could cause them to become entrained in a return air flow which might transport them back toward the separator conduit 100. The air conduit is coupled in fluid flowing relation relative to an adjustable valve 248B. A low pressure air source 249 is provided to the valve 248A.

In the arrangement as seen in the drawings, and as seen in FIG. 5, and in other views, the apparatus 10 includes a plurality of air ejector valves 250 here shown as a first air powered ejector valve array 251, and a second air powered ejector valve array 252. The ejector valve arrays are individually disposed in predetermined spaced relation, one relative to the other. The first and second air powered ejector valve arrays 251 and 252 have individual air ejector valves which are coupled to a source of pressurized air 253 which is best seen by reference to FIG. 7 and following. The respective air ejector valve arrays are positioned in ejecting fluid communication with the rejection container 240, and further communicate with the tobacco lamina reject station 230 by means of the opening 236 which is formed in the first wall 231. Those skilled in the art will recognize that the first and second air powered ejector valve arrays 251 and 252 are responsive to the electrical sorting signal produced by the inspection station 200. When the respective ejector valves 250 are rendered operational, they are effective to provide selected jets of air so as to remove predetermined individually defective tobacco lamina and other contaminants 12 from the air stream 121 which is traveling through the tobacco lamina reject station 200. These rejected tobacco lamina or other contaminants then move under the influence of these selective jets of air into the reject container 240. In the arrangement as shown in the drawings, the reject container 240 has a static air pressure relative to the ambient atmospheric pressure of less than about 1 hPa.

As earlier discussed, relative to the balancing of the air speed between the inspection station 200 and the tobacco lamina reject station 230, it will now be appreciated that the acceptable tobacco lamina and other contaminants 12 traveling in the air stream 121 then moves from the reject station 230 along the separation conduit 100, and then enters an air/tobacco separator which is generally indicated by the numeral 254, and which is well understood in the art (FIG. 7). The air tobacco separator is effective in removing the acceptable tobacco lamina, and then supply it, by gravity flow, to a conduit 255. The conduit 255 then deposits the acceptable tobacco lamina 12, which has been sorted, onto an underlying take-away conveyor 256 which is mounted on the support frame 20, and oriented in receiving relation relative to the conduit 255 for further processing. As seen most clearly by to reference to FIG. 11, for example, the air/tobacco separator 254 is coupled in fluid flowing relation relative to the air stream delivery device 120, and the suction device 130. These devices cooperate with the air/tobacco separator 254 so as to remove the acceptable tobacco lamina from the air stream 121.

Figure 10:
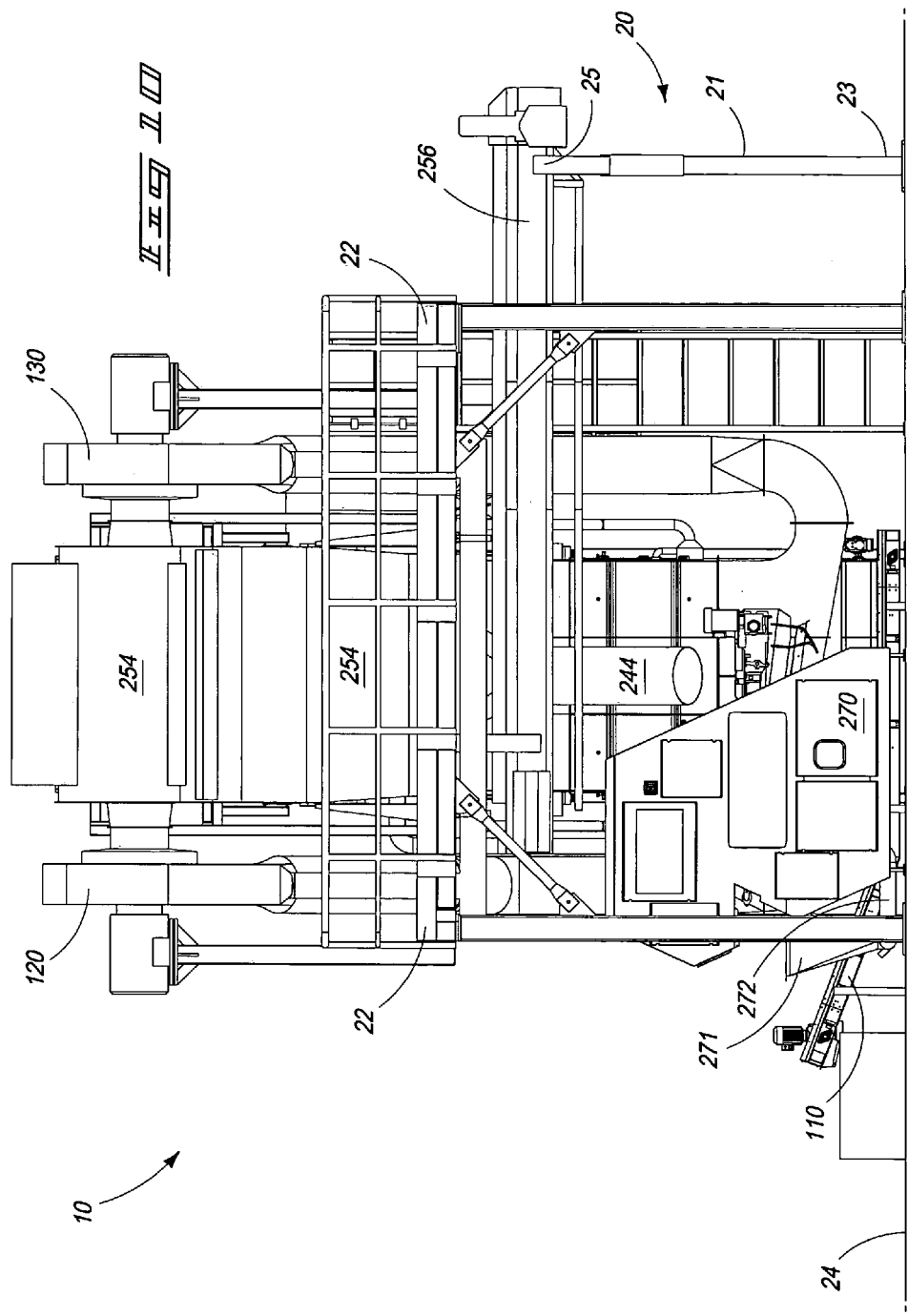
FIG. 10 is a third side elevation view of the present invention and which is taken from a position in 90° offset relation to that seen in FIG. 9.

Referring now to FIG. 10, it will be seen that the present apparatus 10 includes a second optical inspection device which is generally indicated by the numeral 270. This second optical inspection device can be purchased commercially from Key Technology, Inc. of Walla Walla, Wash. under the trademark "OPTYX 3000." This second optical inspection device 270 is mounted in downstream receiving relation relative to the discharge conduit 244. The discharge conduit 244 transports away the rejected tobacco lamina and other contaminants 12 which has been earlier received in the reject container 240. As should be understood, this rejected tobacco lamina, and other contaminants may, on occasion, include acceptable tobacco lamina which has been erroneously identified or otherwise mistakenly ejected from the tobacco lamina reject station 230 by the action of the plurality of air ejector valves 250. This acceptable tobacco lamina 12 is thereafter recovered, and then returned to the apparatus 10 by means of the second optical inspection device 270. In this regard, the second optical inspection device operates in a manner well known in the art, and for purposes of brevity is not discussed further herein. Needless to say, but it should be understood that the second optical inspection device separates any remaining acceptable tobacco lamina 12 that has been erroneously sorted in the inspection station 200, and then places the acceptable tobacco lamina into a container which is generally indicated by the numeral 271, and which is positioned endwardly of the second optical inspection device 270. Further, a discharge conduit 272 is mounted in receiving relation relative to the container 271 (FIG. 7). The discharge conduit 272 has a suction applied thereto and which is operable to remove the acceptable tobacco lamina received in the container 271, and move it to the distal end thereof 273. Mounted in receiving relation relative to the distal end 273 of the discharge conduit 272 is a tobacco separator 274 which is operable to separate the acceptable tobacco lamina from the air stream propelling it along the discharge conduit 272. In this regard, the tobacco separator has an exhaust end 275 which is positioned in gravity feeding relation relative to the first or in-feed conveyor 13 so that the acceptable tobacco lamina 12, which has been recovered by the second optical sorting device 270, may then be returned to the apparatus 10 for further processing. As seen in the drawings, it will be understood that a fan or blower 280 (FIG. 6) is coupled by means of a conduit 281 to the tobacco separator 274 and is operable to create the suction and an air stream, within the discharge conduit 272 so as to move the acceptable tobacco lamina from the container 271 to the tobacco separator 274. Still further, as best seen by reference to FIG. 8, this same fan or blower 280 is coupled in fluid flowing relation by means of a conduit 282 (FIG. 9) to the respective air stream delivery device 120 and suction device 130, as best understood by reference to FIG. 7.

OPERATION

The operation of the aforementioned embodiment of the present invention and the methodology associated with the present invention is best understood by a study of FIG. 1 and following.

An apparatus for the post-threshing inspection and sorting of tobacco lamina 10 includes a separation conduit 100 having a proximal and a distal end 101 and 102, respectively, and an intermediate portion 103. The separation conduit further has an internal facing surface which defines an internal cavity 105 extending between the proximal and distal ends 101 and 102. A first source of pressurized air 120 is delivered to the proximal end 101 of the separation conduit 100. Still further, a second source of pressurized air 80 is delivered to the internal cavity 105 at a location near the intermediate potion 103 of the separation conduit 100. A conveyor 13 is provided for depositing a source of tobacco lamina and other contaminants 12 into the internal cavity 105 at a location between the proximal and distal ends 101 and 102 of the separation conduit 100. The first source of pressurized air 120 creates an air stream 121 carrying the tobacco lamina, and some lighter weight contaminants 12 in the direction of the distal end 102, and the remaining heavier contaminants move, under the influence of gravity toward the proximal end 101 of the separation conduit 100. The second source of pressurized air 80 causes the tobacco lamina 12 being carried by the air stream 121 generated by the first source of pressurized air 120 to move away from the internal facing surface of the separation conduit 100. An inspection station 200 is located downstream of the intermediate portion 103 of the separation conduit 100, and which optically inspects the air stream 121 carrying the tobacco lamina and any contaminants 12, and which identifies defective tobacco lamina, and any contaminants 12 in the air stream 121 passing through the inspection station 200. The inspection station 200 generates an electrical sorting signal. A reject station 230 is operably coupled in sorting signal receiving relation relative to the inspection station 200, and downstream relative thereto, and which ejects or otherwise removes the previously identified defective tobacco lamina, and any other contaminants 12 from the air stream 121 passing through the reject station 230. In the present device, as seen in the drawings, the first and second sources of pressurized air 120 and 80, respectively, each have a given velocity. In the arrangement as seen in the drawings, the second source of pressurized air 80 has a velocity which is equal to or greater than the velocity of the first pressurized air source 120. In one form of the invention, the air provided by this air source has a velocity which is equal to, but not greater than about 1.10 times the velocity of the air stream 121 carrying the source of tobacco lamina and other contaminants 12 through the guide portion 170 of the separation conduit 100.

In the present form of the invention 10, a guide portion 170, as noted above, is provided, and is located in the separation conduit 100, and which is further located downstream of the intermediate portion 103, and upstream of the inspection station 200. The guide portion 170, at least in part, causes the movement of the tobacco lamina 12 being carried by the first source of pressurized air 120 to move away from the internal facing surface 104A of the separation conduit 100. The second source of pressurized air 80 is delivered at a location near the guide portion 170. In the arrangement as seen in the drawings, an inspection portion or station is defined, at least in part, by sidewalls 201, 202, 203 and 204, respectively. The sidewalls 201-204 are further optically transmissive. The inspection station 200 also includes a camera 220 which is focused on the tobacco lamina and other contaminants 12 which pass through the optically transmissive inspection portion, or station 200 which is defined by the sidewalls 201, 202, 203 and 204, respectively. Still further, in the inspection station 200 an illumination source 210 is provided, and which, when energized, emits light which passes through the optically transmissive inspection portion or station 200 of the separation conduit 100 to illuminate the tobacco lamina and other contaminants 12, so that the camera 220 can optically inspect the tobacco lamina and other contaminants 12 traveling in and through the inspection station 200.

As seen in the drawings, the intermediate portion 103 of the separation conduit 100 includes a venturi portion 160. Still further, the reject station 230, as described in the present application, is maintained at substantially ambient pressure.

In the arrangement as seen in the drawings, a suction device 130 is provided, and mounted on the distal end 102 of the separation conduit 100, and which provides a predetermined amount of suction pressure to the reject station 230 in an amount which substantially maintains the flow of the tobacco lamina and other contaminants 12 into the reject station 230; and the flow of acceptable tobacco lamina 12 passing through the reject station to the distal end 102 of the separation conduit 100. As earlier described, a plurality of ejector valves 250 are provided and mounted in the reject station 230, and which are responsive to the electrical sorting signal generated by the inspection station 230. The respective ejector valves 250, when activated, are effective in providing individual jets of air which remove individually unacceptable tobacco lamina and/or other contaminants 12 which were earlier identified in the inspection station 200 as they passed through the reject station 230. A reject container 240 is coupled in receiving relation relative to the to the reject station 230, and which receives the unacceptable tobacco lamina and/or other contaminants 12 which are removed from the product stream by the reject station 230 by the action of the plurality of air ejector valves 250. In the arrangement as seen in the drawings, the apparatus 10 further includes an air lock 30 which joins the separation conduit 100, and the conveyor 13, together, and which further facilitates the delivery of the tobacco lamina, and other contaminants 12, into the internal cavity 105 of the separation conduit 100 from a previous threshing operation 11.

The present invention 10 also relates to a method for the post-threshing inspection, and sorting of tobacco lamina 12 which includes, as a first step, providing a substantially vertically oriented separation conduit 100 which is defined by an internal sidewall 104A, and which has a proximal and a distal end 101 and 102, respectively, and an intermediate portion 103. The internal sidewall 104A of the substantially vertically oriented separation conduit 100 further defines an internal passageway 105 extending between the proximal and distal ends thereof 101 and 102, respectively. The method of the present invention also includes a step of delivering a source of a tobacco lamina, and other contaminants 12, each having given weights, and which have been produced from a threshing operation 11, into the internal passageway 105 at a location which is between the proximal and distal ends 101 and 102 of the substantially vertically oriented separation conduit 100. The method of the present invention includes another step of delivering a first air stream 121, having a given air pressure and volume, into the proximal end 101 of the vertically oriented separation conduit 100, and which is sufficient to carry away tobacco lamina and other contaminants 12 which weigh less than about 0.8 grams, in the direction of the distal end 102 of the substantially vertically oriented separation conduit 100. The method of the present invention also includes another step of delivering a second air stream 80 having a given air pressure and volume, into the internal passageway 105 which is defined by the substantially vertically oriented separation conduit 100 at a location near the intermediate portion 103 thereof. The tobacco lamina and other contaminants 12 being carried by the air stream 121 are moved away from internal sidewall 104A of the substantially vertically oriented separation conduit 100. The method of the present invention also includes another step of providing an inspection station 200 which is located intermediate the proximal and distal ends 101 and 102 of the substantially vertically oriented separation conduit 100, and downstream relative to the second air stream 80, and which visually identifies defective tobacco lamina and other contaminants 12 which are being carried by the air stream 121. The method of the present invention also includes a further step of providing a reject station 230 which is located downstream of the inspection station 200, and operably coupling the reject station 230 with the inspection station 200. Finally, the method of the present invention includes a step of removing defective tobacco lamina and other contaminants 12 being carried by the air stream 121 in the reject station 230.

In the methodology of the present invention, a further step is provided of reducing a cross sectional dimension of the internal passageway 205 which is defined by the substantially vertically oriented separation conduit 100 in the intermediate portion 103 thereof. The method of the invention further includes another step of introducing the second air stream 80 at a location which is downstream of the intermediate portion 103 of the separation conduit 100, and at a velocity which is greater than or equal to a velocity of the first air stream 121. In the method of the present invention, a further step is provided of maintaining the reject station 230 at substantially ambient pressure; and providing a reject container 240 coupled in receiving relation relative to the reject station 230, and maintaining the reject container 240 at substantially ambient pressure.

In the present invention, a further step of the methodology includes providing a suction device 130 which is coupled in fluid flowing relation relative to the distal end 102 of the separation conduit 100, and which, when energized, is effective in maintaining a speed of movement of the tobacco lamina, and other contaminants 12, which are passing into, and out of, the reject station 230, and in the direction of the distal end 102 of the separation conduit. The method of the present invention further includes another step of providing an optically transmissive portion 201-204 of the separation conduit 100 and which forms, in part, an inspection station 200. The inspection station is located downstream of the intermediate portion 103, and upstream relative to the rejection station 230. The methodology of the present invention also includes another step of providing an illumination device 210 located in the inspection station 200, and which, when energized emits visible light which illuminates the tobacco lamina and other contaminants 12 which pass through the optically transmissive portion 201-204 of the separation conduit 100. In the methodology as anticipated by the present invention, the method includes yet another step of providing a camera 220 which is located in the inspection station 200, and which can optically inspect the illuminated tobacco lamina and other contaminants 12 passing through optically transmissive portion 201-204 of the separation conduit 100, and which can generate an electrical signal when the camera optically identifies a defective tobacco lamina or other contaminants 12 in the inspection station 200. The present methodology also includes another step of controllably coupling the camera 220 with the reject station 230, and supplying an electrical sorting signal generated by the inspection station 200, and which is caused, in part, by the camera 220, to the reject station 230. As earlier discussed, the step of removing the defective tobacco lamina and other contaminants 12 further includes the steps of providing a plurality of air powered ejectors 250 which are formed into an array 251/252; and locating the air powered ejector arrays 251/252 in the reject station 230. The method also includes another step of controllably coupling the array of air powered ejectors 251/252, with the camera 220; and selectively activating predetermined individual air powered actuators 250 with the electrical sorting signal generated by a computer 223 which is operably coupled with the camera 220 so as to remove defective tobacco lamina or other contaminants 12 from the rejection station 230.

Therefore, it will be seen that the present invention 10 provides a convenient means for the post-threshing 11 inspection and sorting of tobacco lamina 12 in a convenient cost effective manner which avoids the shortcomings attendant with the prior art teachings which have been utilized, heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. Apparatus for the post-threshing inspection and sorting of tobacco lamina, comprising:
    a separation conduit having a proximal and a distal end, and an intermediate portion, and further having an internal facing surface which defines an internal cavity extending between the proximal and distal ends;
    a first source of pressurized air delivered to the proximal end of the separation conduit and which forms an air stream;
    a selectively moveable wall having opposite sides, and which is mounted within the separation conduit, and which further, when moved, adjusts the air speed of the air stream traveling on one side of the moveable wall, and does not pass through the moveable wall;
    a second source of pressurized air delivered to the internal cavity at a location near the intermediate portion of the separation conduit;
    a guide portion made integral with the separation conduit and which is located downstream of the intermediate portion, and upstream of the inspection station, and wherein the guide portion facilitates, at least in part, the movement of a source of tobacco lamina being carried by the air stream generated by the first source of pressurized air to move away from the internal facing surface of the separation conduit, and wherein the second source of pressurized air is delivered at a location near the guide portion;
    a conveyor for depositing the source of tobacco lamina and other contaminants into the internal cavity at a location between the proximal and distal ends of the separation conduit, and wherein the first source of pressurized air creates the air stream carrying the tobacco lamina and some contaminants in the direction of the distal end, and the remaining contaminants move, under the influence of gravity toward the proximal end of the separation conduit;
    an inspection station located downstream of the intermediate portion of the separation conduit, and which optically inspects the air stream carrying the tobacco lamina and any contaminants and which identifies defective tobacco lamina and any contaminants in the air stream passing through the inspection station, and generates an electrical signal; and
    a reject station operably coupled in signal receiving relation relative to the inspection station and downstream relative thereto, and which ejects the previously identified defective tobacco lamina and any contaminants from the air stream passing through the reject station and wherein the reject station is maintained at a substantially ambient pressure.

2. An apparatus as claimed in claim 1, and wherein the first and second sources of pressurized air each have a respective velocity, and wherein the second source of pressurized air has a velocity which is equal to or greater than the velocity of the first pressurized air source.

3. An apparatus as claimed in claim 1, and further comprising:
    an inspection portion of the separation conduit which is located in the inspection station, and which is further optically transmissive, and wherein the inspection station further comprises a camera which is focused on the tobacco lamina and other contaminants which are passing through the optically transmissive inspection portion of the separation conduit; and an illumination source, which, when energized, emits light which passes through the optically transmissive inspection portion of the separation conduit to illuminate the tobacco lamina and other contaminants so that the camera can optically inspect the tobacco lamina and other contaminants traveling in the inspection portion.

4. An apparatus as claimed in claim 1, and wherein the intermediate portion comprises a venturi portion.

5. An apparatus as claimed in claim 1, and further comprising:
    a suction device mounted on the distal end of the separation conduit, and which provides a predetermined amount of suction pressure to the rejection station in an amount which substantially maintains the flow of the tobacco lamina and other contaminants into the rejection station, and the flow of acceptable tobacco lamina passing through the rejection station to the distal end of the separation conduit.

6. An apparatus as claimed in claim 5, and further comprising:
    a plurality of ejector valves mounted in the reject station and responsive to the electrical signal generated by the inspection station, and wherein the ejector valves, when activated are effective in providing a jet of air which removes individually unacceptable tobacco lamina and/or other contaminants which were identified in the inspection station as they pass through the reject station.

7. An apparatus as claimed in claim 6, and further comprising:
    a rejection container coupled in receiving relation relative to the to the reject station and which receive the unacceptable tobacco lamina and/or other contaminants which are removed from the reject station by the action of the plurality of ejector valves.

8. An apparatus as claimed in claim 1, and further comprising:
    an air lock which joins the separation conduit, and the conveyor and which facilitates the delivery of the tobacco lamina, and other contaminants, into the internal cavity of the separation conduit;
    a delivery chute operably coupled with the air lock and the separation conduit, and which further delivers the source of the tobacco lamina, and other contaminants, to the separation conduit; and
    an air manifold operably coupled with the delivery chute and which delivers an air stream which impedes sedimentation of the tobacco lamina and other contaminants within the delivery chute.

9. A method for the post-threshing inspection and sorting of tobacco lamina, comprising:
    providing a substantially vertically oriented separation conduit defined by an internal sidewall and which has a proximal and a distal end, and an intermediate portion, and wherein the internal sidewall of the substantially vertically oriented separation conduit further defines an internal passageway extending between the proximal and distal ends;

providing a substantially moveable wall within the internal passageway of the separation conduit, and wherein the moveable wall has opposite sides;

delivering a source of a tobacco lamina, and other contaminants each having given weights, and which have been produced from a threshing operation, into the internal passageway at a location which is between the proximal and distal ends of the substantially vertically oriented separation conduit;

delivering a first air stream having a given air pressure, volume, and speed into the proximal end of the vertically oriented separation conduit and which is sufficient to carry away tobacco lamina and other contaminants which weigh less than about 0.8 grams/cm$^2$ and in the direction of the distal end of the substantially vertically oriented separation conduit;

adjusting the position of the moveable wall within the separation conduit so as to adjust the speed of the first air stream, and wherein the first air stream does not pass through the moveable wall;

delivering a second air stream having a given air pressure and volume into the internal passageway defined by the substantially vertically oriented separation conduit at a location near the intermediate portion thereof, and wherein the tobacco lamina and other contaminants being carried by the first air stream are moved away from internal sidewall of the substantially vertically oriented separation conduit;

providing an inspection station located intermediate the proximal and distal ends of the substantially vertically oriented separation conduit and downstream relative to the second air stream, and which visually inspects and identifies defective tobacco lamina and other contaminants being carried by the air stream;

providing a reject station which is located downstream of the inspection station and operably coupling the reject station with the inspection station;

providing a suction device which is coupled in fluid flowing relation relative to the distal end of the separation conduit, and which, when energized, is effective in maintaining a speed of movement of the tobacco lamina and other contaminants passing into, and out of, the reject station, and in the direction of the distal end of the separation conduit; and removing defective tobacco lamina and other contaminants being carried by the air stream in the reject station.

10. A method as claimed in claim 9, and further comprising:

reducing a cross sectional dimension of the internal passageway which is defined by the substantially vertically oriented separation conduit in the intermediate portion thereof.

11. A method as claimed in claim 9, and wherein the step of delivering the second air stream further comprises:

introducing the second air stream at a location which is downstream of the intermediate portion of the separation conduit and at a velocity which is greater than or equal to the speed of the first air stream.

12. A method as claimed in claim 9, and wherein the step of providing a reject station further comprises:

maintaining the reject station at substantially ambient pressure; and providing a rejection container coupled in receiving relation relative to the reject station and maintaining the rejection container at substantially ambient pressure.

13. A method as claimed in claim 9, and wherein the step of providing an inspection station further comprises:

providing an optically transmissive portion of the separation conduit which is located downstream of the intermediate portion, and upstream relative to the reject station;

providing an illumination device located in the inspection station, and which, when energized emits visible light which illuminates the tobacco lamina and other contaminants which pass through the optically transmissive portion of the separation conduit;

providing a camera which is located in the inspection station and which can optically inspect the illuminated tobacco lamina and other contaminants passing through optically transmissive portion of the separation conduit, and which can generate an electrical signal when the camera optically identifies a defective tobacco lamina or other contaminants; and controllably coupling the camera with the reject station, and supplying the electrical signal generated by the camera to the reject station.

14. A method as claimed in claim 9, and wherein the step of removing the defective tobacco lamina and other contaminants further comprises:

providing a plurality of air powered ejectors which are formed into an array, and locating the array of air powered ejectors in the reject station;

controllably coupling the array of air powered ejectors with the camera; and selectively activating predetermined individual air powered actuators with the electrical signal generated by the camera so as to remove defective tobacco lamina or other contaminants from the reject station.

15. An apparatus for post-threshing inspection and sorting of tobacco lamina, comprising:

a separation conduit having a proximal end, a distal end, and an intermediate portion, and wherein the separation conduit further has an internal facing surface which defines an internal cavity which extends between the proximal and distal ends;

a first source of pressurized air delivered to the proximal end of the separation conduit, and which produces an air stream which moves at a given speed from the proximal, to the distal end of the separation conduit;

a selectively moveable wall having opposite surfaces, and which is mounted within the separation conduit and which further is located between the proximal and distal ends of the separation conduit, and which, when moved, adjusts the speed of the air stream traveling on one side of the moveable wall, and wherein the air stream does not pass through the moveable wall;

a guide portion positioned downstream of the selectively moveable wall, and made integral with the intermediate portion, and which defines a portion of the internal cavity, and wherein a first and a second guide plate are individually mounted in the internal cavity of the guide portion, and further individually define respective spaces therebetween the respective guide plates, and the adjacent guide portion, and wherein the air stream generated by the first source of pressurized air passes between the respective guide plates, and not through the respective spaces defined by the first and second guide plates;

an air injection port which is made integral with the guide portion, and which is fluid flowingly coupled with each of the spaces defined by the respective first and second guide plates;

a second source of pressurized air delivered to the respective air injection ports, and which travels along the respective spaces defined by the respective guide plates, and into the portion of the internal cavity which is defined by the guide portion, and at a given speed which is equal to, or greater than, the speed of the air stream delivered by the first source of pressurized air;

a conveyor for carrying a source of tobacco lamina, and other contaminants, to the separation conduit, and wherein the conveyor has an intake and a discharge end;

an air lock positioned in downstream relation relative to the distal end of the conveyor, and which receives the tobacco lamina, and other contaminants, which are transported by the conveyor, and wherein the air lock deposits the source of tobacco lamina, and other contaminants into the internal cavity of the separation conduit at a location between the proximal and the distal ends thereof, and wherein the air stream generated by the first source of pressurized air carries the tobacco lamina, and other contaminants, in the direction of the distal end of the separation conduit, and between the guide plates which are mounted in the guide portion, and wherein the second source of pressurized air traveling along the guide portion causes the tobacco lamina, and other contaminants, being carried by the air stream generated by the first source of pressurized air to move away from internal facing surface of the separation conduit, and pass centrally through the guide portion;

a delivery chute defining an internal passageway which is coupled in downstream receiving relation relative to the air lock, and which is further located in upstream delivering relationship relative to the separation conduit, and wherein the delivery chute has a first end coupled to the air lock, and a second end coupled to the separation conduit, and wherein the delivery chute is defined, in part, by a back sidewall, and a bottom sidewall which are spaced apart to form a gap;

an air manifold which is operably coupled to a second air stream which enters the air manifold, and escapes through the air manifold, and wherein the second air stream escaping from the air manifold passes through the gap formed by the back and bottom sidewall of the delivery chute, and then further engages the source of tobacco lamina, and other contaminants, delivered by the air lock to the delivery chute so as to impede sedimentation of the tobacco lamina, and other contaminants, on the bottom sidewall of the delivery chute, and to further move the tobacco lamina, and other contaminants, into the separation conduit;

an inspection station located downstream of the guide portion, and which optically inspects the air stream carrying the tobacco lamina, and any other contaminants, which have been substantially centralized by the guide portion, and which further identifies defective tobacco lamina, and any contaminants, which are passing through the inspection station, and which further generates an electrical signal;

a reject station coupled in signal receiving relation relative to the inspection station, and downstream relative thereto, and which ejects the previously identified defective tobacco lamina, and any contaminants, from the air stream passing through the reject station, and wherein the reject station is maintained at substantially ambient pressure;

a rejection container coupled in receiving relation relative to the rejection station, and which receives the unacceptable tobacco lamina and/or other contaminants which are removed from the rejection station by the action of the reject station, and wherein the rejection container is maintained at substantially ambient pressure; and a suction device mounted on the distal end of the separation conduit, and which provides a predetermined amount of suction pressure to the reject station in an amount which substantially maintains the flow of the tobacco lamina, and other contaminants, into the reject station, and the flow of acceptable tobacco lamina passing through the reject station, and to the distal end of the separation conduit, while simultaneously not withdrawing previously rejected tobacco lamina, and other contaminants, from the rejection container.

* * * * *